(12) United States Patent
Maekawa

(10) Patent No.: US 9,983,949 B2
(45) Date of Patent: May 29, 2018

(54) RESTORATION DETECTING METHOD, RESTORATION DETECTING APPARATUS, AND RESTORATION DETECTING PROGRAM

(71) Applicant: FUJITSU LIMITED, Kawasaki-shi, Kanagawa (JP)

(72) Inventor: Takahiro Maekawa, Nagoya (JP)

(73) Assignee: FUJITSU LIMITED, Kawasaki (JP)

( * ) Notice: Subject to any disclaimer, the term of this patent is extended or adjusted under 35 U.S.C. 154(b) by 12 days.

(21) Appl. No.: 14/733,545

(22) Filed: Jun. 8, 2015

(65) Prior Publication Data

US 2015/0363279 A1  Dec. 17, 2015

(30) Foreign Application Priority Data

Jun. 12, 2014 (JP) .................................. 2014-121307

(51) Int. Cl.
| | |
|---|---|
| *G06F 11/00* | (2006.01) |
| *G06F 11/14* | (2006.01) |
| *G06F 9/455* | (2018.01) |

(52) U.S. Cl.
CPC ...... *G06F 11/1469* (2013.01); *G06F 9/45533* (2013.01); *G06F 9/45558* (2013.01); *G06F 11/1451* (2013.01); *G06F 2009/45591* (2013.01); *G06F 2201/84* (2013.01)

(58) Field of Classification Search
CPC .......................... G06F 11/1451; G06F 11/1469
See application file for complete search history.

(56) References Cited

U.S. PATENT DOCUMENTS

| | | | |
|---|---|---|---|
| 5,950,208 A | 9/1999 | Kamei | |
| 6,826,514 B1 | 11/2004 | Antico et al. | |
| 2010/0049930 A1* | 2/2010 | Pershin | G06F 11/1451 |
| | | | 711/162 |
| 2011/0225582 A1 | 9/2011 | Iikura et al. | |
| 2014/0297597 A1* | 10/2014 | Matsubara | G06F 9/461 |
| | | | 707/681 |

FOREIGN PATENT DOCUMENTS

| | | |
|---|---|---|
| JP | 8-278967 | 10/1996 |
| JP | 2002-544636 | 12/2002 |
| JP | 2007-207271 | 8/2007 |
| JP | 2009-86701 A | 4/2009 |
| JP | 2011-186783 | 9/2011 |
| WO | 00/70579 | 11/2000 |

OTHER PUBLICATIONS

Japanese Office Action dated Jan. 9, 2018 for corresponding Japanese Patent Application No. 2014-121307, with English Translation, 7 pages.

* cited by examiner

*Primary Examiner* — Bryce Bonzo
*Assistant Examiner* — Katherine Lin
(74) *Attorney, Agent, or Firm* — Fujitsu Patent Center

(57) ABSTRACT

A restoration detecting method includes receiving, by a processor, from a monitoring target virtual machine, file size information indicating a file size of a specific file, the file size of which cumulatively increases as the virtual machine runs, and detecting, by a processor, restoration of the virtual machine on a basis of the received file size information.

9 Claims, 25 Drawing Sheets

FIG. 12A

SPECIFIC FILE 20140227150000
20140227150100
20140227150200
20140227150300
20140227150400
. .
20140228091500
20140228091600

FILE SIZE: 49376 BYTES

FIG. 12B

SPECIFIC FILE (AFTER 1 MINUTE)

20140227150000
20140227150100
20140227150200
20140227150300
20140227150400
. .
20140228091500
20140228091600
20140228091700

FILE SIZE: 49392 BYTES

FIG. 13A

SPECIFIC FILE

20140227150000
20140227150100
20140227150200
20140227150300
20140227150400
· ·
20140302090000
20140302090100
20140302090200

FILE SIZE: 79696 BYTES

FIG. 13B

SPECIFIC FILE (AFTER 1 MINUTE)

· ·
20140227150000
20140227150100
20140227150200
20140302090300

FILE SIZE: 16336 BYTES

FIG. 14A

MONITORING MANAGEMENT
INFORMATION

MONITORING MANAGEMENT INFORMATION
(AFTER VM 32 UPDATE)

MONITORING MANAGEMENT
INFORMATION

MONITORING MANAGEMENT INFORMATION
(AFTER VM 32 UPDATE)

VM31 , 17364 , 160
VM32 , 5782 , 160
VM33 , 45215 , 160
VM34 , 231 , 160

NEW FILE SIZE INFORMATION RECEIVED BY VM 32:
5782 BYTES

RESTORATION DETECTING METHOD, RESTORATION DETECTING APPARATUS, AND RESTORATION DETECTING PROGRAM

CROSS-REFERENCE TO RELATED APPLICATION

This application is based upon and claims the benefit of priority of the prior Japanese Patent Application No. 2014-121307, filed on Jun. 12, 2014, the entire contents of which are incorporated herein by reference.

FIELD

The present invention relates to a restoration detecting method, a restoration detecting apparatus, and a restoration detecting program.

BACKGROUND

In recent years, according to the improvement of the performance of physical machines, researches of a virtualization technique for integrating a plurality of virtual machines (VMs) in one physical machine are ongoing. In the virtualization technique, for example, virtualization software (hypervisor) allocates the physical machine to the plurality of virtual machines and enables provision of services by application programs installed in the virtual machines. In recent years, a provider that provides a use environment of the virtual machines such as resources and infrastructures of the physical machine (hereinafter referred to as infrastructure provider) rents out the virtual machines to a provider that provides, for example, services using the virtual machines (hereinafter referred to as service provider). The infrastructure provider rents out the virtual machines to the service provider on the basis of conditions prescribed by a contract.

The virtual machines sometimes have a function of storing a state of a system at a certain point in time (hereinafter referred to as snapshot function). With this function, for example, when a failure occurs, the service provider is capable of taking measures for, for example, restoring the system to a state before the occurrence of the failure. On the other hand, for example, when a user who uses a service by the service provider performs an unauthorized access or the like, the snapshot function enables the service provider to erase a use history or the like of the user. Therefore, the service provider disposes, for example, in the physical machine in which the virtual machines are created, software for monitoring the virtual machine (hereinafter referred to as monitoring software) or the like and monitors changes of a state including restoration of the virtual machines (see, for example, Japanese Laid-open Patent Publication No. H8-278967, Japanese Laid-open Patent Publication No. 2011-186783, Japanese Laid-open Patent Publication No. 2007-207271, and Japanese National Publication of International Patent Application No. 2002-544636).

SUMMARY

When the infrastructure provider rents out the virtual machines to the service provider, the infrastructure provider sometimes grants the service provider only access authority to the virtual machines rented out to the service provider. This means that the service provider may be unable to access the physical machine in which the virtual machines managed by the service provider are created. Therefore, the service provider may be unable to install monitoring software or the like for detecting restoration of the virtual machines in the physical machine. Further, in the virtual machine restored by the snapshot function, all kinds of information including a system time inside the virtual machines are restored. For that reason, the service provider may be unable to detect the restoration of the virtual machine according to only the information in the virtual machines. Therefore, in this case, since an access to the physical machine is limited, the service provider may be unable to easily detect the restoration of the virtual machines.

According to an aspect of the embodiments, a restoration detecting method includes: receiving, by a processor, from a monitoring target virtual machine, file size information indicating a file size of a specific file, the file size of which cumulatively increases as the virtual machine runs; and detecting, by a processor, restoration of the virtual machine on a basis of the received file size information.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 12A and 12B are diagrams for explaining the details of the restoration detection processing in the first embodiment.

FIGS. 13A and 13B are diagrams for explaining the details of the restoration detection processing in the first embodiment.

FIGS. 14A and 14B are diagrams for explaining the details of the restoration detection processing in the first embodiment.

FIGS. 19A and 19B are diagrams depicting specific examples of the monitoring management information in the second embodiment.

DESCRIPTION OF EMBODIMENTS

Configuration of an Information Processing System

Figure 1:
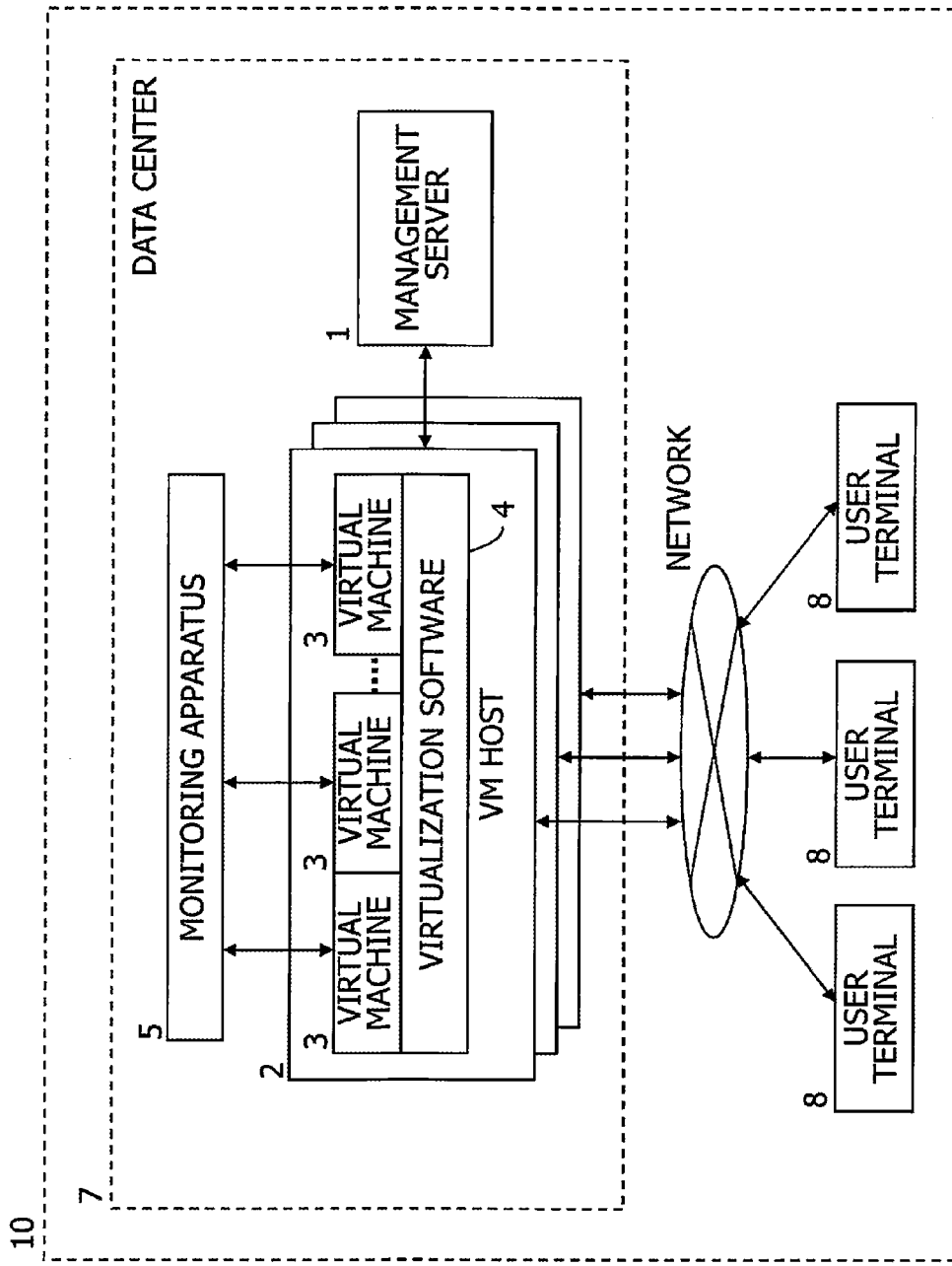
FIG. 1 is a diagram depicting the overall configuration of an information processing system.

FIG. 1 is a diagram depicting the overall configuration of an information processing system. In an information processing system 10 depicted in FIG. 1, a management server 1 and a physical machine 2 (hereinafter also referred to as VM host 2), in which virtual machines are created, are provided in a data center 7. User terminals 8 are accessible to the data center 7 via a network such as the Internet or an intranet.

In an example depicted in FIG. 1, the VM host 2 is configured from a plurality of physical machines. The physical machines include central processing units (CPUs), random access memories (RAMs), and large-capacity storage media such as hard disk drives (HDDs). Resources of the VM host 2 are allocated to a plurality of virtual machines 3.

For example, the management server 1 is accessible to the VM host 2. The management server 1 performs an instruction to create the virtual machines 3 in the VM host 2 and management of the created virtual machines 3.

For example, a service provider provides a user with an infrastructure and the like of the virtual machines 3 through a network (hereinafter referred to as cloud service). The cloud service is a service for providing, through the network, a base for building and operating a computer system, that is, the virtual machines 3 and the infrastructure itself such as the network. For example, the user accesses a cloud service portal site from the user terminal 8, selects specifications needed for the virtual machines, for example, a clock frequency of CPUs, a capacity (GB) of memories, a capacity (MB/sec, IOPS) of hard disks, and communication band width (Gbps) of a network, and enters into a cloud use contract concerning the specifications. For example, the user terminal 8 enables monitoring of an operation state of the virtual machines 3 and operation of the virtual machines 3. In the example depicted in FIG. 1, the virtual machines 3 are accessible to a monitoring apparatus 5 (hereinafter also referred to as restoration detecting apparatus 5) provided in the data center 7.

Virtualization software 4 is base software for allocating, according to an instruction from the management server 1, resources such as the CPUs, the memories, the hard disks, and the network of the VM host 2 to thereby operate the virtual machines 3. For example, the virtualization software 4 operates in the VM host 2.

In addition to the allocated resources of the VM host 2, the virtual machines 3 include, for example, image files including operating systems (OSs), middleware, applications, databases, and the like in the hard disks thereof. For example, during a start, the virtual machines 3 write the image files in the memories from the hard disks and perform operations corresponding to a desired service.

The virtual machines 3 in the example depicted in FIG. 1 have, for example, a snapshot function for storing a state (content of a file, a system configuration, and the like) of the system at a certain point in time. With this function, the virtual machines 3 can be restored to specific timing (timing when a state of the system is stored) in the past. Therefore, for example, when a failure occurs, the service provider is capable of taking measures for, for example, restoring the system to a state before the occurrence of the failure.

The monitoring apparatus 5 is, for example, an apparatus for detecting the restoration of the virtual machines 3 by the snapshot function. When the virtual machines 3 include the snapshot function, a user who uses a service provided by the service provider is capable of, after performing an unauthorized access or the like, erasing a use history or the like of the user. Therefore, as depicted in FIG. 1, the service provider provides, for example, the monitoring apparatus 5 separately from the monitoring target virtual machines 3 and detects restoration in the monitoring target virtual machines 3. Note that the monitoring apparatus 5 needs to be provided on the outside of the virtual machines 3 in order to detect the restoration of the virtual machines 3. The service provider may cause a usable part of the virtual machines 3 to function as the monitoring apparatus 5.

Monitoring of the Virtual Machines by the Monitoring Apparatus

Figure 2:
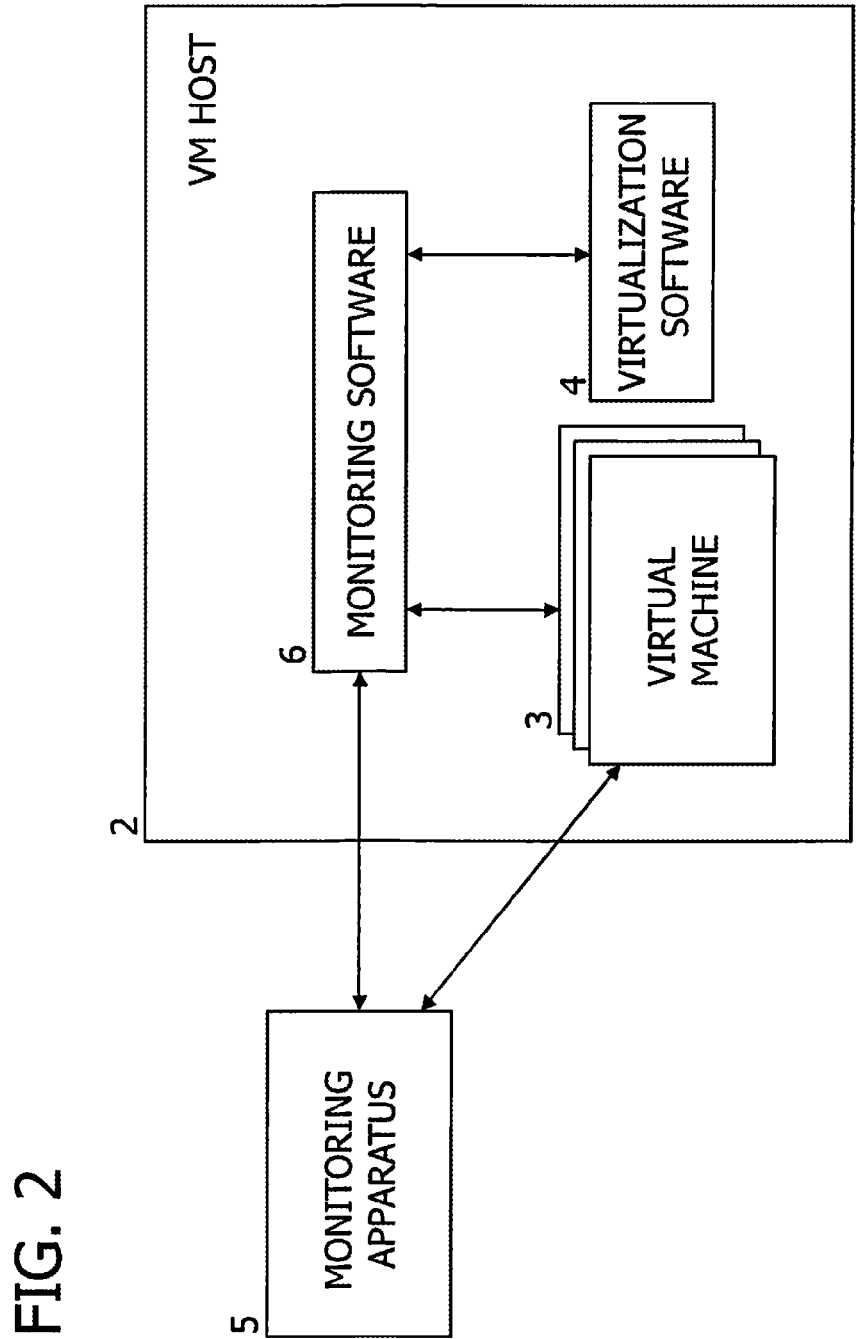
FIG. 2 is a diagram for explaining a detecting method for restoration of the virtual machines.
Figure 3:
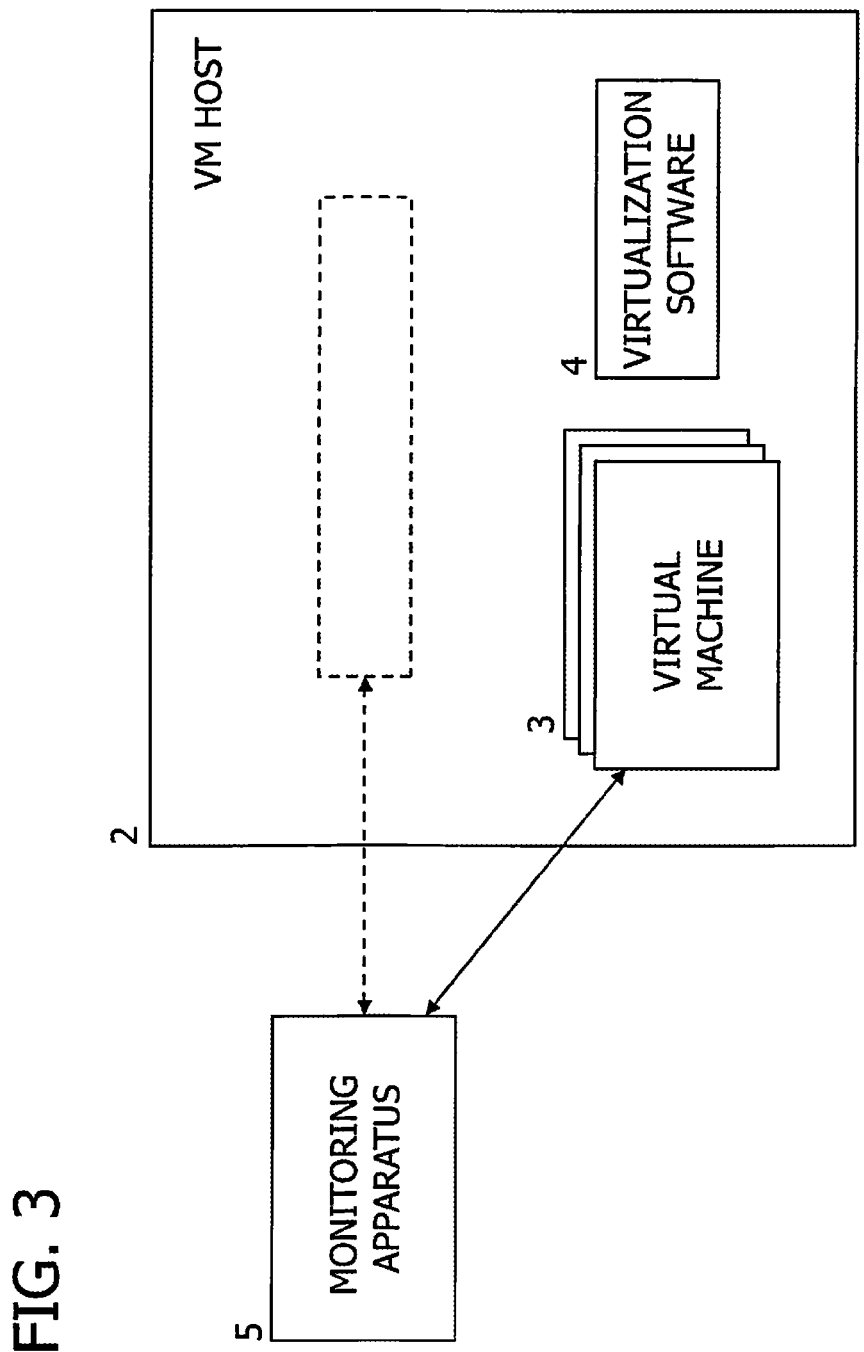
FIG. 3 is a diagram for explaining a detecting method for restoration of the virtual machines.

Monitoring of the virtual machines by the monitoring apparatus 5 is explained. FIGS. 2 and 3 are diagrams for explaining a detecting method for restoration of the virtual machines.

In an example depicted in FIG. 2, in the VM host 2, monitoring software 6 accessible to the monitoring apparatus 5 is installed. The monitoring software 6 acquires, for example, information concerning states of the virtual machines 3 and the virtualization software 4 and transmits the acquired information to the monitoring apparatus 5.

In recent years, separation of an infrastructure provider that manages the VM host 2 and rents out resources and the like of the virtual machines 3 and a service provider that hires the virtual machines 3 from the infrastructure provider and performs various services for users is ongoing. According to the separation of the infrastructure provider and the service provider, in some case, the service provider is allowed to access only the virtual machines 3 hired from the infrastructure provider and is not allowed to access the VM host 2 in which the virtual machines 3 are created. Therefore, in this case, as depicted in FIG. 3, the service provider sometimes may be unable to install the monitoring software 6 in the VM host 2 managed by the infrastructure provider.

FIG. 3 is a diagram in which the monitoring software 6 is not installed in the VM host 2. When restoration of the virtual machines 3 occurs in a state depicted in FIG. 3, in the virtual machines 3, all kinds of information including a system time on the inside returns to a system state at time of a restoration destination. For that reason, even if the service provider refers to the information in the restored virtual machine 3, the service provider may be unable to determine whether the restoration occurs in the virtual machines 3.

Therefore, in the example depicted in FIG. 3, the service provider may be unable to detect the restoration of the virtual machines 3.

Therefore, in this embodiment, the monitoring apparatus 5 receives, from the monitoring target virtual machines 3, file size information indicating a file size of a specific file, the file size of which cumulatively increases. The monitoring apparatus 5 detects the occurrence of the restoration of the virtual machine 3 on the basis of the received file size information. Consequently, it is possible to detect the restoration of the monitoring target virtual machine 3.

Configurations of the Virtual Machines and the Monitoring Apparatus

Figure 4:
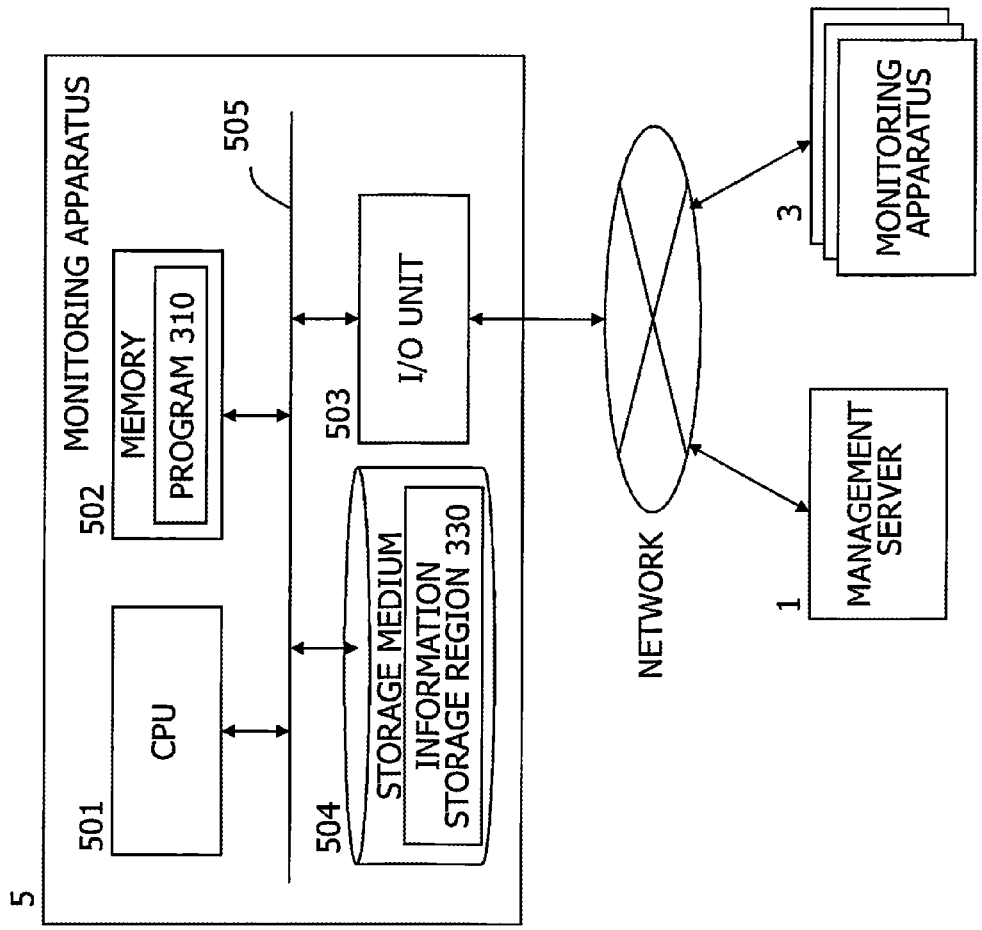
FIG. 4 is a diagram depicting the hardware configuration of the monitoring apparatus.

First, the configuration of the monitoring apparatus 5 is explained. FIG. 4 is a diagram depicting the hardware configuration of the monitoring apparatus. The monitoring apparatus 5 includes a CPU 501, which is a processor, a memory 502, an external interface (I/O unit) 503, and a storage medium 504. The units are connected to one another via a bus 505. The storage medium 504 stores, for example, in a program storage region (not depicted in the figure) in the storage medium 504, a program 510 (hereinafter also referred to as restoration detecting program) for performing processing for detecting restoration of the virtual machines 3 (hereinafter also referred to as restoration detection processing). As depicted in FIG. 4, during execution of the program 510, the CPU 501 loads the program 510 from the storage medium 504 to the memory 502 and performs the restoration detection processing in cooperation with the program 510. The storage medium 504 includes, for example, an information storage region 530 (hereinafter also referred to as storing unit 530) for storing information used when the restoration detection processing is performed.

Figure 5:
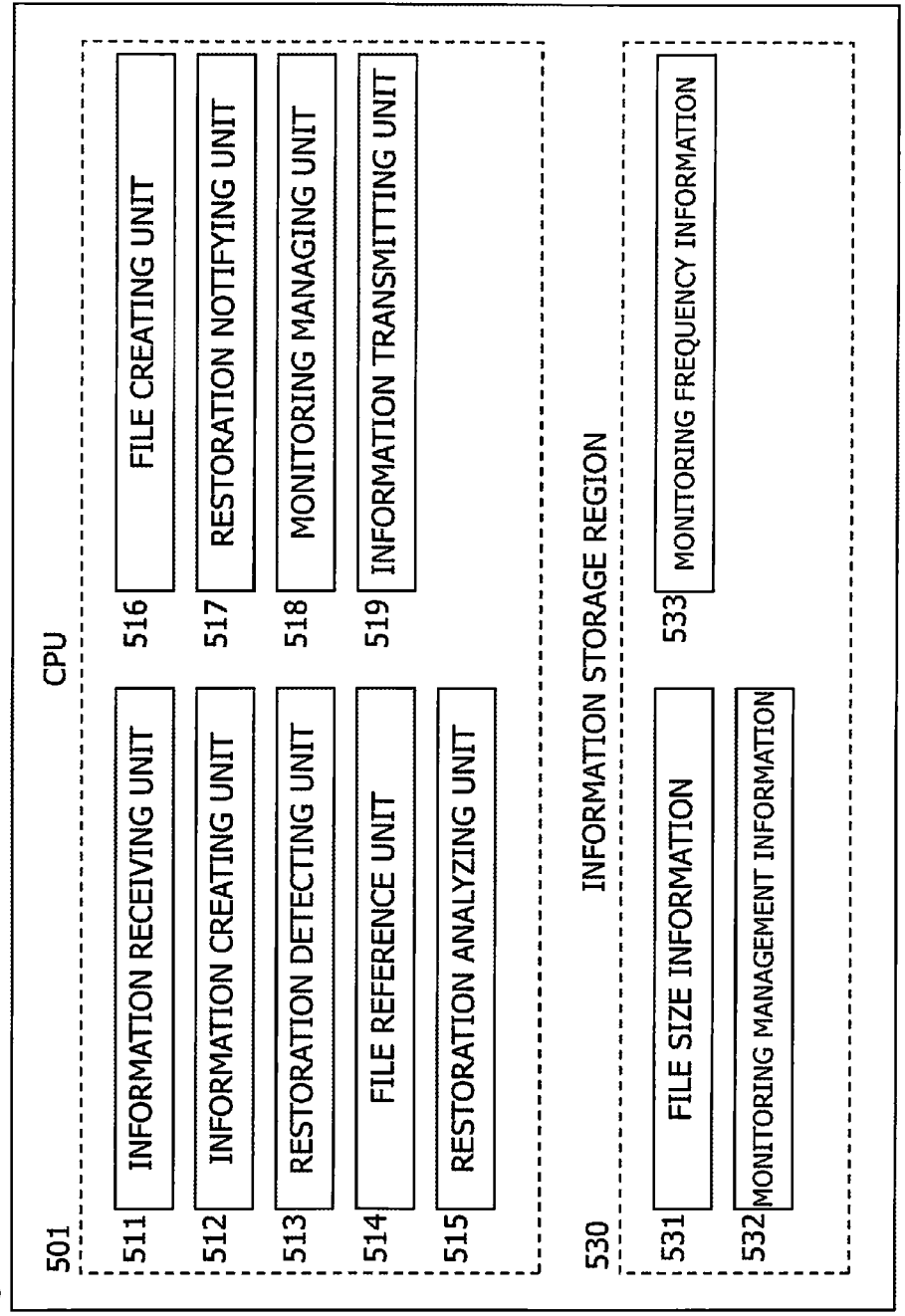
FIG. 5 is a functional block diagram of the monitoring apparatus depicted in FIG. 4.

FIG. 5 is a functional block diagram of the monitoring apparatus depicted in FIG. 4. The CPU 501 cooperates with the program 510 to thereby operate as, for example, an information receiving unit 511 (hereinafter also referred to as receiving unit 511), an information creating unit 512, a restoration detecting unit 513 (hereinafter also referred to as detecting unit 513), a file reference unit 514, and a restoration analyzing unit 515. The CPU 501 cooperates with the program 510 to thereby operate as, for example, a file creating unit 516, a restoration notifying unit 517, a monitoring managing unit 518, and an information transmitting unit 519. In the information storage region 530, for example, file size information 531, monitoring management information 532, and monitoring frequency information 533 are stored.

The information receiving unit 511 receives, for example, file size information 531 indicating file sizes of specific files in the monitoring target virtual machines 3. Specifically, the monitoring target virtual machine 3 acquires, for example, present file sizes of the specific files disposed in the respective virtual machines 3 and transmits the present file sizes to the monitoring apparatus 5 as the file size information 531. The information receiving unit 511 may receive the file size information 531 transmitted by the virtual machine 3. Note that the file size information 531 may include, in addition to the file sizes of the specific files, for example, identification information of the virtual machines 3 in which the respective specific files are disposed.

The information creating unit 512 stores, as the monitoring management information 532, in the information storage region 530, for example, information including the file size information 531 received from the monitoring target virtual machine 3. The information creating unit 512 may store, as the monitoring management information 532, for example, the received file size information 531 and the identification information for identifying the monitoring target virtual machines 3 in association with each other. Details of the monitoring management information 532 are explained below.

The restoration detecting unit 513 compares, for example, a plurality of kinds of the file size information 531 received from the monitoring target virtual machines 3. The restoration detecting unit 513 detects on the basis of, for example, the plurality of kinds of file size information 531, restoration of the monitoring target virtual machines 3. Details of a restoration detecting method for the virtual machines 3 are explained below.

For example, when the restoration detecting unit 513 detects restoration of the monitoring target virtual machines 3, the file reference unit 514 refers to the specific files in the virtual machines 3 in order to analyze contents of the specific files. For example, the file reference unit 514 may instruct the information receiving unit 511 to acquire the specific files to be referred to. The instructed information receiving unit 511 may acquire the specific files.

The restoration analyzing unit 515 calculates time at a restoration destination of the virtual machines 3 on the basis of, for example, the content of the specific file referred to by the file reference unit 514. A method of calculating the time at the restoration destination of the virtual machines 3 is explained below.

For example, when the monitoring apparatus 5 creates the specific files in the virtual machines 3, the file creating unit 516 creates the specific files. For example, the file creating unit 516 may access the monitoring target virtual machines 3 at every predetermined time and update the specific files. The creation and the update of the specific files by the monitoring apparatus 5 are explained below.

For example, when the restoration detecting unit 513 detects restoration of the monitoring target virtual machines 3, the restoration notifying unit 517 notifies the management server 1 and the like that the monitoring target virtual machines 3 are restored. For example, when the restoration analyzing unit 515 calculates the time at the restoration destination of the virtual machines 3, the restoration notifying unit 517 notifies the management server 1 and the like of the time at the restoration destination of the virtual machines 3.

The monitoring managing unit 518 instructs on the basis of, for example, the monitoring frequency information 533 stored in the information storage region 530, the information receiving unit 511 to acquire the file size information 531 of the specific files. The monitoring managing unit 518 updates the monitoring frequency information 533 according to, for example, a request from the service provider.

For example, when the monitoring apparatus 5 detects restoration in cooperation with monitoring software (not depicted in the figure) installed in the monitoring target virtual machines 3, the information transmitting unit 519 transmits the file size information 531 and the like stored in the information storage region 530 to the monitoring software in the virtual machines 3.

First Embodiment

Figure 6:
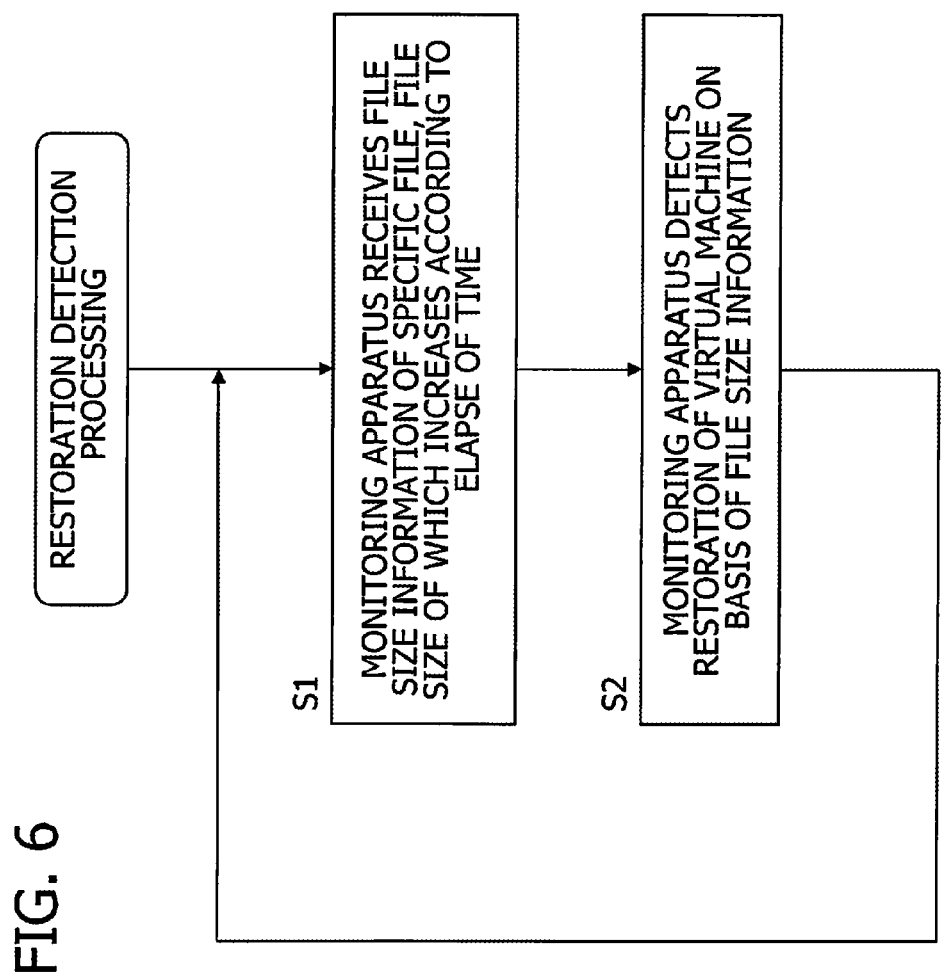
FIG. 6 is a flowchart for explaining the overview of restoration detection processing in the first embodiment.
Figure 7:
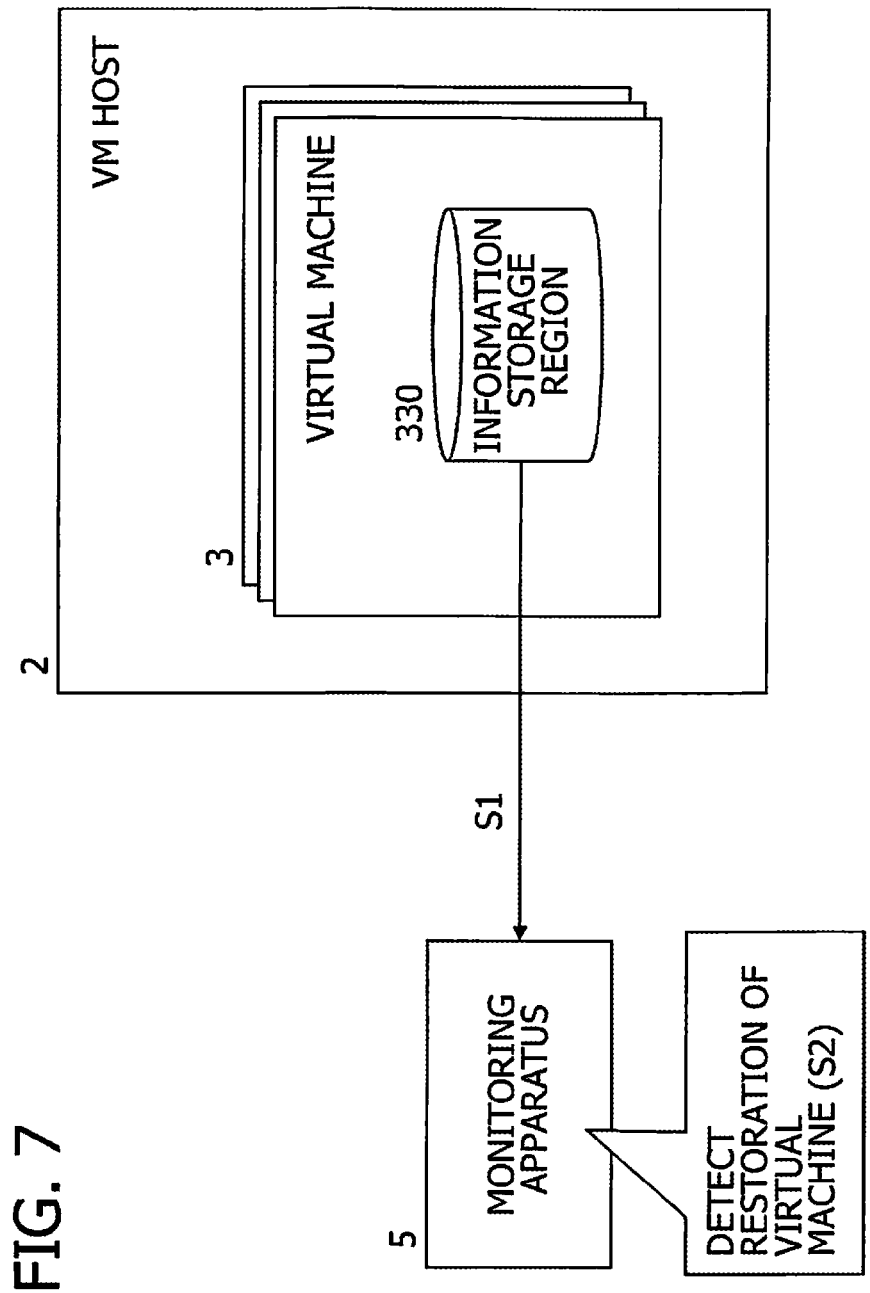
FIG. 7 is a diagram for explaining the overview of the restoration detection processing in the first embodiment.

A first embodiment is explained. FIG. 6 is a flowchart for explaining the overview of restoration detection processing in the first embodiment. FIG. 7 is a diagram for explaining the overview of the restoration detection processing in the first embodiment. The overview of the restoration detection processing in FIG. 6 is explained with reference to FIG. 7.

First, for example, as depicted in FIG. 7, the monitoring apparatus 5 receives, from an information storage region 330 of the monitoring target virtual machine 3, the file size information 531 of the specific file, the file size of which cumulatively increases in the virtual machine 3 (S1). The monitoring apparatus 5 may periodically access the information storage region 330 and acquire the file size information 531 of the specific file. A frequency of acquisition of the file size information 531 by the monitoring apparatus 5 is, for example, a one-minute interval. For example, the monitoring apparatus 5 may refer to content of the monitoring frequency information 533 and determine, on the basis of the content of the monitoring frequency information 533, a frequency of acquisition of the file size information.

The monitoring apparatus 5 detects restoration of the virtual machine 3 on the basis of, for example, the received file size information 531 (S2). The monitoring apparatus 5 detects the restoration of the virtual machine 3 on the basis of, for example, a file size indicated by file size information (hereinafter also referred to as first file size information) of a specific file received at certain time in the past (hereinafter also referred to as first time) and a file size indicated by file size information (hereinafter also referred to as second file size information) of a specific file received at time (hereinafter also referred to as second time) later than the first time. For example, when a file size of a specific file received anew is smaller than a file size of the same specific file received in the past, the monitoring apparatus 5 determines that the restoration of the virtual machine 3 occurs. The file size information 531 received from the monitoring target virtual machine 3 is explained below.

Figure 8:
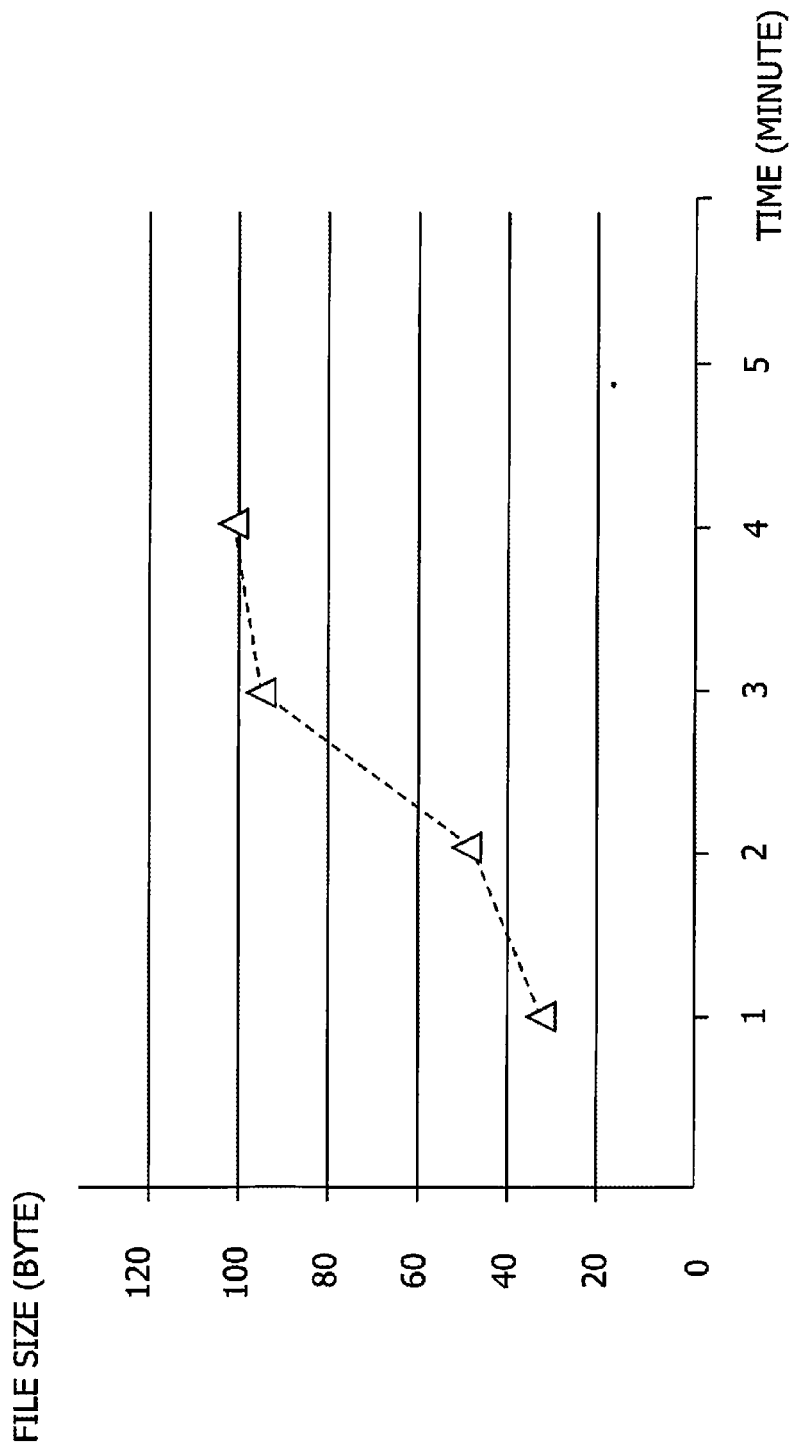
FIG. 8 is a diagram depicting specific example of the file size information 531 received by the monitoring apparatus 5.
Figure 9:
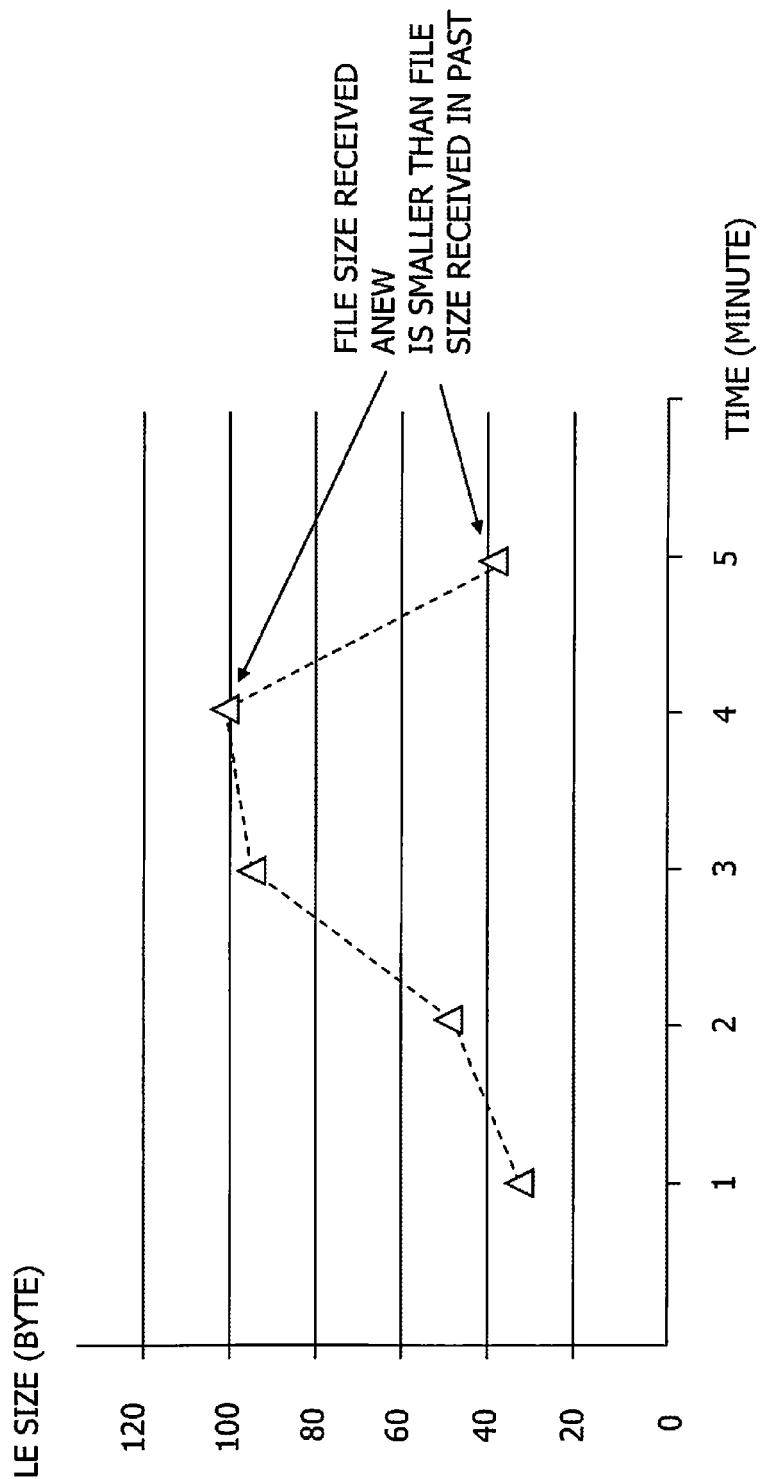
FIG. 9 is a diagram depicting specific example of the file size information 531 received by the monitoring apparatus 5.

FIGS. 8 and 9 are diagrams depicting specific example of the file size information 531 received by the monitoring apparatus 5. In the examples depicted in FIGS. 8 and 9, the abscissa indicates time and the ordinate indicates a file size of a specific file. In the examples depicted in FIGS. 8 and 9, white triangles indicate points where times when the file size information 531 is received and file sizes indicated by the received file size information 531 correspond to each other. Note that, in the examples depicted in FIGS. 8 and 9, the monitoring apparatus 5 receives the file size information 531 at a one-minute interval.

As depicted in FIG. 8, the file size of the specific file in this embodiment cumulatively increases according to the elapse of time. Therefore, during normal operation, the file size indicated by the file size information 531 received anew is not smaller than the file size indicated by the file size information 531 received in the past.

On the other hand, in the example depicted in FIG. 9, the file size indicated by the file size information received anew (the file size information 531 received at a point of time of 5 minutes) is smaller than the file size of the file size information 531 received in the past (e.g., the file size information 531 received at a point in time of 4 minutes). Therefore, in this case, the monitoring apparatus 5 can determine that redundancy occurs in the virtual machine 3 in which the specific file is disposed.

First, the monitoring apparatus 5 determines a specific file, the file size of which cumulatively increases in the monitoring target virtual machine 3. The monitoring apparatus 5 receives, for example, the file size information 531 at a plurality of times of the determined specific file. In this case, since the specific file is a file, the file size of which cumulatively increases, during the normal operation, the file size indicated by the received file size information 531 is not smaller than the file size information 531 received in the past. Therefore, when the monitoring apparatus 5 detects the presence of a specific file, the file size of which indicated by the received file size information 531 is smaller than the file size indicated by the file size information 531 received in the past, the monitoring apparatus 5 can determine that the virtual machine 3 in which the specific file is disposed is restored.

In this way, according to the first embodiment, the monitoring apparatus 5 receives the file size information indicating the file size of the specific file, the file size of which cumulatively increases, from the monitoring target virtual machine 3. The monitoring apparatus 5 detects restoration of the monitoring target virtual machine 3 on the basis of the received file size information. Consequently, the service provider is capable of detecting the restoration of the monitoring target virtual machine 3, for example, without installing monitoring software in the VM host 2 in which the monitoring target virtual machine 3 is created (without accessing the VM host 2). Therefore, after a malicious user performs unauthorized access or the like to the virtual machine 3, it is possible to detect restoration of the virtual machine 3 performed using the snapshot function.

Note that, in some case, the monitoring apparatus 5 have, in advance, the file size information 531 (the known file size information 531) of the virtual machine 3 at certain time (hereinafter also referred to as third time). Specifically, when a specific file is created, the monitoring apparatus 5 stores, in the information storage region 530, the file size information 531 (e.g., an initial value 0 byte) of the specific file at the creation time. In this case, the monitoring apparatus 5 receives, at least once, for example, the file size information 531 at time (hereinafter also referred to as fourth time) different from the third time from the monitoring target virtual machine 3. The monitoring apparatus 5 is capable of detecting restoration of the monitoring target virtual machine 3. That is, in this case, the monitoring apparatus 5 is capable of detecting restoration of the virtual machine 3 on the basis of the known file size information 531 and the received file size information 531. Consequently, the monitoring apparatus 5 is capable of acquiring the file size information 531 of the virtual machine 3 without receiving the file size information 531 from the virtual machine 3 a plurality of times.

Details of the First Embodiment

Figure 10:
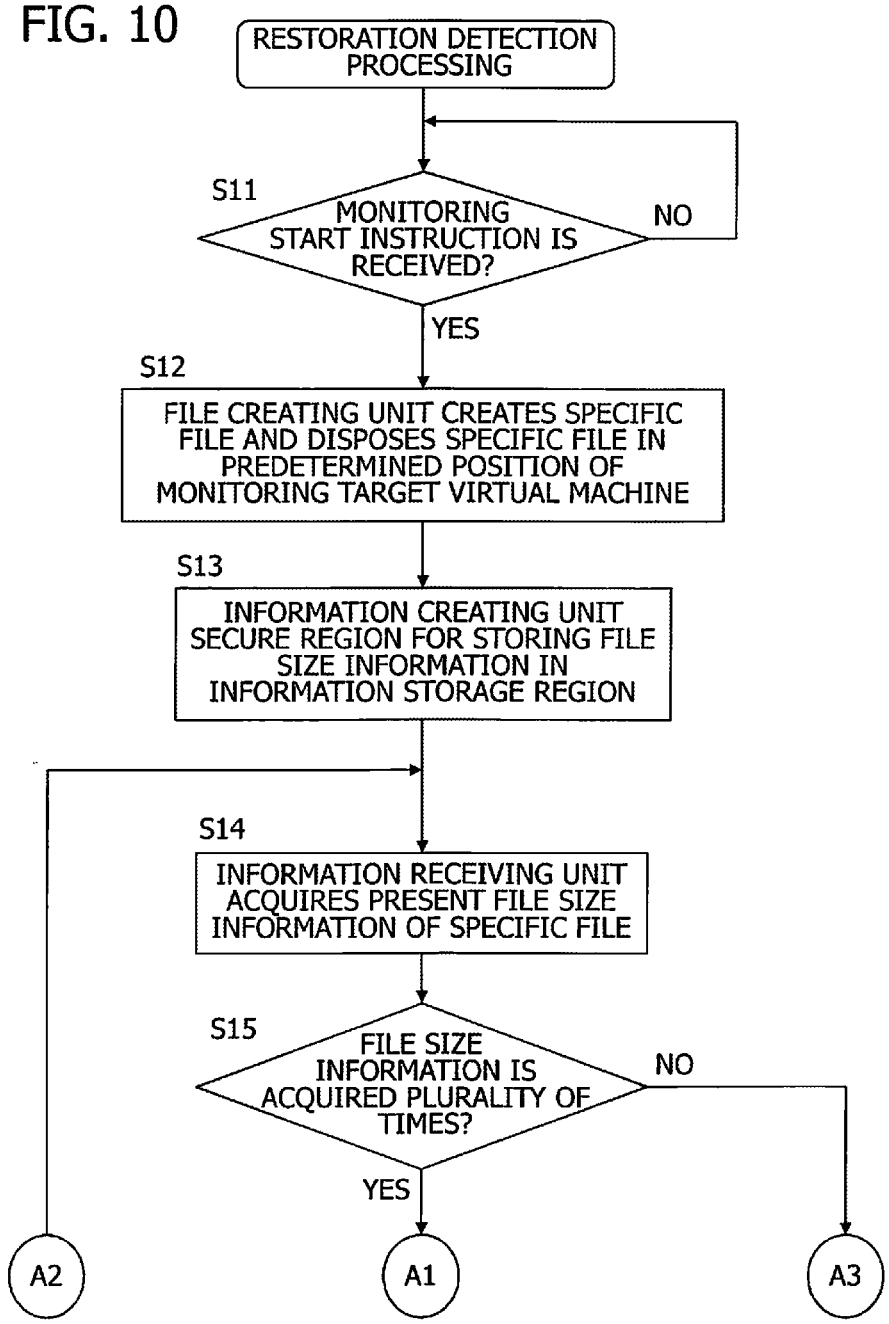
FIG. 10 is a flowchart for explaining details of restoration detection processing in the first embodiment.
Figure 11:
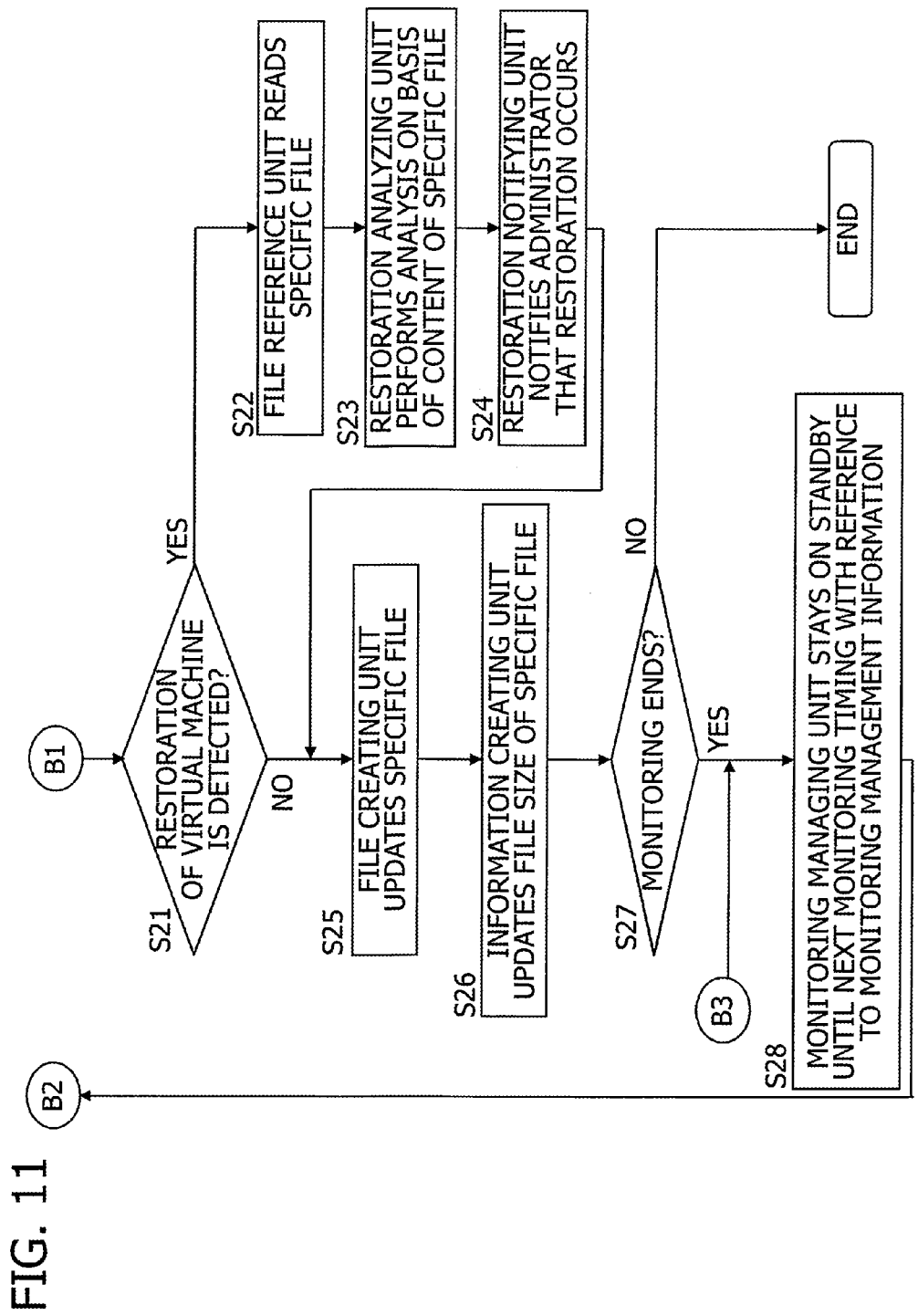
FIG. 11 is a flowchart for explaining details of restoration detection processing in the first embodiment.

Details of the first embodiment are explained. FIGS. 10 and 11 are flowcharts for explaining details of restoration detection processing in the first embodiment. FIGS. 12 to 14 are diagrams for explaining the details of the restoration detection processing in the first embodiment. The details of the restoration detection processing in FIGS. 10 and 11 are explained with reference to FIGS. 12 to 14. Note that, in the following explanation, the monitoring apparatus 5 receives the file size information 531 from the monitoring target virtual machine 3 a plurality of times and detects restoration of the virtual machine 3 (when the monitoring apparatus 5 does not have the known file size information 531).

First, as depicted in FIG. 10, the information receiving unit 511 of the monitoring apparatus 5 stays on standby, for example, until the information receiving unit 511 receives a monitoring start instruction from the management server 1 or the like (S11). When the monitoring start instruction is received (YES in S11), the file creating unit 516 of the monitoring apparatus 5 creates, for example, a specific file to be set as a monitoring target and disposes the specific file in the monitoring target virtual machine 3 (the virtual machine 3 for which the monitoring start instruction is received) (S12).

Specifically, for example, the monitoring apparatus 5 creates a specific file, the file size of which cumulatively increases, and disposes the specific file in the virtual machine 3. The specific file may be a file that stores, for example, at every predetermined time, a time stamp indicating present time at that time. In this case, in the specific file, every time the time stamp is stored, a file size equivalent to the stored time stamp increases. When the virtual machine 3 is started, the monitoring apparatus 5 is capable of cumulatively increasing the file size of the specific file according to the elapse of time. Therefore, by monitoring the file size of the specific file, when the file size of the specific file decreases, the monitoring apparatus 5 is capable of determining that restoration occurs in the virtual machine 3 in which the specific file is disposed. Note that the file creating unit 516 needs to dispose the specific file in a position where content and the file size of the specific file can be referred to in the monitoring target virtual machine 3.

Subsequently, the information creating unit 512 of the monitoring apparatus 5 secures, for example, a storage region for storing the file size information 531 of the specific file in the information storage region 530 (S13). After receiving the file size information 531 of the specific file from the monitoring target virtual machine 3, the monitoring apparatus 5 is capable of storing the information.

For example, the information receiving unit 511 accesses the monitoring target virtual machine 3 and acquires the file size information 531 of the specific file (S14). The file size information 531 may be transmitted by, for example, an application installed in the virtual machine 3. The information receiving unit 511 may acquire the file size information 531 by receiving the same.

Further, when the information receiving unit 511 acquires the file size of the specific file a plurality of times (YES in S15), the restoration detecting unit 513 of the monitoring apparatus 5 detects restoration of the virtual machine 3, for example, as depicted in FIG. 11 (S21). That is, in this embodiment, the monitoring apparatus 5 detects restoration of the monitoring target virtual machine 3 on the basis of a change in the file size of the specific file. Therefore, in order to acquire information concerning the change in the file size, the monitoring apparatus 5 needs to have received the file size information 531 of the specific file a plurality of times. Therefore, for example, when the monitoring apparatus 5 in this embodiment has not received the file size information 531 a plurality of times, the monitoring apparatus 5 does not detect restoration of the virtual machine 3. Specific examples of the detection of restoration by a restoration detecting method for the virtual machine 3 are explained below.

Specific Examples of the Detection of Restoration of the Virtual Machine

FIGS. 12A to 13B are diagrams for explaining specific examples of a specific file. The restoration detecting method for the virtual machine 3 is explained with reference to a specific file depicted in FIGS. 12A to 13B. Note that, in the examples depicted in FIGS. 12A to 13B, the monitoring apparatus 5 creates a specific file and stores time stamps in the specific file.

The specific file depicted in FIG. 12A is a file in which the monitoring apparatus 5 stores a time stamp at every minute. Specifically, the specific file depicted in FIG. 12A is, in a state in which time stamps are stored up to a time stamp (20140228091600 in FIG. 12A), stored from the start of monitoring to 9:16:00 on Feb. 28, 2014. The file size of the specific file in the state depicted in FIG. 12A is 49376 bytes.

FIG. 12B is the example of the specific file after the elapse of 1 minute from the state depicted in FIG. 12A. That is, the specific file depicted in FIG. 12B is in a state in which the next time stamp is further stored in the state depicted in FIG. 12A. Specifically, in the specific file depicted in FIG. 12B, in addition to the time stamps stored in the state depicted in FIG. 12A, a time stamp (20140228091700) at 9:17:00 on Feb. 28, 2014 is stored.

The file size of the specific file in the case of FIG. 12B is 49392 bytes. Therefore, the file size increases from the file size 49376 of the specific file in the state depicted in FIG. 12A. That is, the specific file depicted in FIGS. 12A and 12B is a file corresponding to a file, the file size of which cumulatively increases. Therefore, by monitoring the file size of the specific file depicted in FIGS. 12A and 12B, the monitoring apparatus 5 is capable of detecting restoration of the virtual machine 3 in which the specific file is disposed. Note that the monitoring apparatus 5 may refer to a file size of a specific file received in the past, for example, referring to the monitoring management information 532 stored in the information storage region 530.

On the other hand, FIGS. 13A and 13B are specific examples of a specific file obtained when restoration of the virtual machine 3 occurs. The specific file depicted in FIG. 13A is, in a state in which time stamps are stored up to a time stamp (20140302090200 in FIG. 13A), stored from the start of monitoring to 9:02:00 on Mar. 2, 2014. The specific file depicted in FIG. 13B is an example of the specific file after the elapse of 1 minute from the state depicted in FIG. 13A. In the specific file depicted in FIG. 13B, a time stamp (20140302090300 in FIG. 13B) at 9:03:00 on Mar. 2, 2014 is stored after the time stamp at 15:02:00 on Feb. 27, 2014. That is, in a state depicted in FIG. 13B, compared with the state depicted in FIG. 13A, time stamps from 15:03:00 on Feb. 27, 2014 to 9:02:00 on Mar. 2, 2014 are deleted. A file size in the state depicted in FIG. 13B is 16336 bytes and decreases from the file size 79696 bytes in the state depicted in FIG. 13A. Therefore, when the monitoring apparatus 5 receives the file size information 531 of the specific file in the state depicted in FIG. 13B, the monitoring apparatus 5 can detect that restoration occurs in the virtual machine 3 in which the specific file is disposed.

Referring back to FIG. 11, when restoration of the virtual machine 3 is detected (YES in S21), the monitoring apparatus 5 performs, for example, a detailed examination concerning the restoration of the monitoring target virtual machine 3. Therefore, in this case, the file reference unit 514 of the monitoring apparatus 5 accesses the virtual machine 3 and refers to the specific file (S22). For example, the restoration analyzing unit 515 of the monitoring apparatus 5 analyzes the specific file (S23). Specifically, the restoration analyzing unit 515 calculates, for example, time at a restoration destination of the virtual machine 3. For example, the restoration notifying unit 517 of the monitoring apparatus 5 may notify an administrator (the management server 1) to the effect that the restoration occurs in the monitoring target virtual machine 3 (S24).

Note that, in the example depicted in FIG. 13B, the time stamp at 9:02:00 on Mar. 2, 2014 is not deleted. The time stamp at 9:03:00 on Mar. 2, 2014 is deleted. Therefore, the monitoring apparatus 5 can determine that the virtual machine 3 is restored to a state between these times. That is, for example, with the monitoring apparatus 5 being adopting, as the specific file, a file in which time stamps are periodically stored, it is possible to detect not only occurrence of restoration of the monitoring target virtual machine 3 but also time at a restoration destination.

Specifically, when the monitoring apparatus 5 detects restoration of the monitoring target virtual machine 3, the monitoring apparatus 5 calculates time differences between times indicated by time stamps (hereinafter also referred to as first time stamps) stored in the specific file and time stamps (hereinafter also referred to as second time stamps) stored in the specific file after the first time stamps. When restoration of the virtual machine 3 does not occur, the calculated time differences are time intervals (in the examples depicted in FIGS. 13A and 13B, 1 minute). Therefore, most of the calculated time differences are 1 minute in the examples depicted in FIGS. 13A and 13B.

When a time difference larger than the time interval for storing time stamps is present among the calculated time differences, the monitoring apparatus 5 determines that time at the restoration destination of the monitoring target virtual machine 3 is included in times before the time interval for recording time stamps elapses from the times indicated by the first stamps. In the example depicted in FIG. 13B, the time stamp indicating 9:03:00 on Mar. 2, 2014 is stored after the time stamp indicating 15:02:00 on Feb. 27, 2014. A time difference between the time stamps is equal to or larger than 1 minute. Therefore, in this case, the monitoring apparatus 5 can determine that the time at the restoration destination of the monitoring target virtual machine 3 is included in time before 1 minute elapses from 15:02:00 on Feb. 27, 2014. Note that, by reducing the interval for storing time stamps in the specific file, when restoration of the virtual machine 3 occurs, the monitoring apparatus 5 is capable of more accurately detecting time at a restoration destination of the virtual machine 3.

The monitoring apparatus 5 may determine the time at the restoration destination of the virtual machine 3 on the basis of the file size of the specific file without referring to content of the specific file. In the examples depicted in FIGS. 13A and 13B, whereas the file size of the specific file in the state depicted in FIG. 13A is 79696 bytes, the file size of the specific file in the state depicted in FIG. 13B is 16336 bytes. In this case, for example, the monitoring apparatus 5 divides a difference between these file sizes by an increase amount (in the examples depicted in FIGS. 12A to 13B, 16 bytes) of the file size per 1 minute. Consequently, it is possible to calculate length of time indicated by the deleted time stamp. For example, by subtracting the length of the time indicated by the deleted time stamp from the present time, the monitoring apparatus 5 is capable of calculating time at the restoration destination of the virtual machine 3.

Specifically, in the examples depicted in FIGS. 13A and 13B, the monitoring apparatus 5 divides a value obtained by subtracting 16336 bytes from 79696 bytes by 16 bytes, which is the increase amount of the file size per 1 minute, and calculates 3960 minutes as the length of the time indicated by the deleted time stamp. The monitoring apparatus 5 may calculate, for example, 15:03:00 on Feb. 27, 2014 earlier than the present time 9:03:00 on Mar. 2, 2014 by 3960 minutes and determine this time as the time at the restoration destination of the virtual machine 3.

Referring back to FIG. 11, when restoration of the virtual machine 3 is detected (NO in S21), for example, the file creating unit 516 updates the specific file in the monitoring target virtual machine 3 (S25). The information creating unit 512 updates, for example, the monitoring management information 532 stored in the information storage region 530 (S26). Consequently, the monitoring apparatus 5 is capable of continuing the monitoring of the monitoring target virtual machine 3. Specific examples of the monitoring management information 532 are explained below.

Specific Example of the Monitoring Management Information

FIGS. 14A and 14B are diagrams depicting the specific examples of the monitoring management information 532. In the example depicted in FIG. 14A, the monitoring management information 532 stores, on the basis of the file size information 531 received from the monitoring target virtual machines 3, identification information for identifying the virtual machines 3 and latest file sizes of the specific files disposed in the respective virtual machines 3 in association with each other. In the example depicted in FIG. 14A, the monitoring apparatus 5 monitors the file size information 531 of four virtual machines 3 (VM 31, VM 32, VM 33, and VM 34). In the example depicted in FIG. 14A, the latest file sizes of the virtual machines 3 are respectively 17364 bytes, 5462 bytes, 45215 bytes, and 2313 bytes.

For example, when the restoration detecting unit 513 detects restoration of the monitoring target virtual machine 3 (521), the restoration detecting unit 513 refers to the monitoring management information 532 and acquires the stored file size information 531. The restoration detecting unit 513 compares the present file size information 531 acquired in 514 and the stored file size information 531. Consequently, when a file size received anew is smaller than a file size in the past stored in the monitoring management information 532, it is possible to detect restoration of the monitoring target virtual machine 3.

Specifically, the example depicted in FIG. 14B indicates a state in which the information receiving unit 511 receives the file size information 531 of the virtual machine 32 anew in the state depicted in FIG. 14A. For example, the restoration detecting unit 513 compares a file size indicated by the file size information 531 received from the virtual machine 32 anew and a file size stored in association with the virtual machine 32. In this case, the file size (e.g., 5782 bytes) indicated by the file size information 531 received from the virtual machine 32 anew is larger than the file size (in the example depicted in FIG. 14A, 5462 bytes) stored in association with the virtual machine 32. Therefore, the restoration detecting unit 513 determines that restoration does not occur in the virtual machine 32. As depicted in FIG. 14B, the information creating unit 512 stores, for example, 5782 bytes, which is the file size indicated by the file size information 531 stored in association with the VM 32, in the monitoring management information 532.

Note that, in the examples depicted in FIGS. 14A and 14B, the monitoring apparatus 5 stores only the latest file sizes concerning the monitoring target virtual machines 3. However, the monitoring apparatus 5 may store file sizes including file sizes received in the past.

Referring back to FIG. 11, after changing the monitoring management information 532 on the basis of the received file size information 531 (S26), for example, the monitoring managing unit 518 of the monitoring apparatus 5 refers to the information storage region 530 and stays on standby for time indicated by the monitoring frequency information 533 (YES in S27 and S28). That is, the monitoring managing unit 518 adjusts time to detect restoration of the virtual machine 3 on the basis of content of the monitoring frequency information 533 stored in the information storage region 530. On the other hand, when ending the monitoring of the monitoring target virtual machine 3 (NO in S27), the monitoring apparatus 5 ends the restoration detection processing.

Note that, in the example depicted in FIGS. 10 and 11, when the file creating unit 516 of the monitoring apparatus 5 creates the specific file and receives the file size information 531, the file creating unit 516 updates the content of the specific file. On the other hand, when a file, the file size of which is guaranteed to cumulatively increase, is present in the virtual machine 3, a file in the virtual machine 3 may be used as the specific file. The virtual machine 3 may update the specific file according to an application or the like installed in the virtual machine 3. In this case, since the file creating unit 516 does not need to create or update the specific file, the file creating unit 516 is capable of reducing a load on the CPU and the like when the monitoring is performed.

The specific file may be, for example, a log file that accumulates a log (e.g., a log including information concerning a memory use amount) output in the virtual machine 3. The log file is desirably a file (a file, the file size of which increases) in which a new log is accumulated every time the monitoring apparatus 5 acquires the file size information 531 from the monitoring target virtual machine 3. Further, the specific file may be, for example, a file in which the number of files configuring the specific file increases. That is, the specific file may be a file group configured from a plurality of files. In the specific file, for example, every time fixed time elapses (e.g., every time a date changes), a new file may be created by the monitoring target virtual machine 3 or the like. Specifically, the specific file may be a file group or the like in which a generated log is managed as a separate file for each day. In this case, the monitoring apparatus 5 may receive, for example, the file size information 531 including the file size of the specific file and information concerning the number of files and detect restoration of the monitoring target virtual machine 3 on the basis of the number of files.

Second Embodiment

Figure 15:
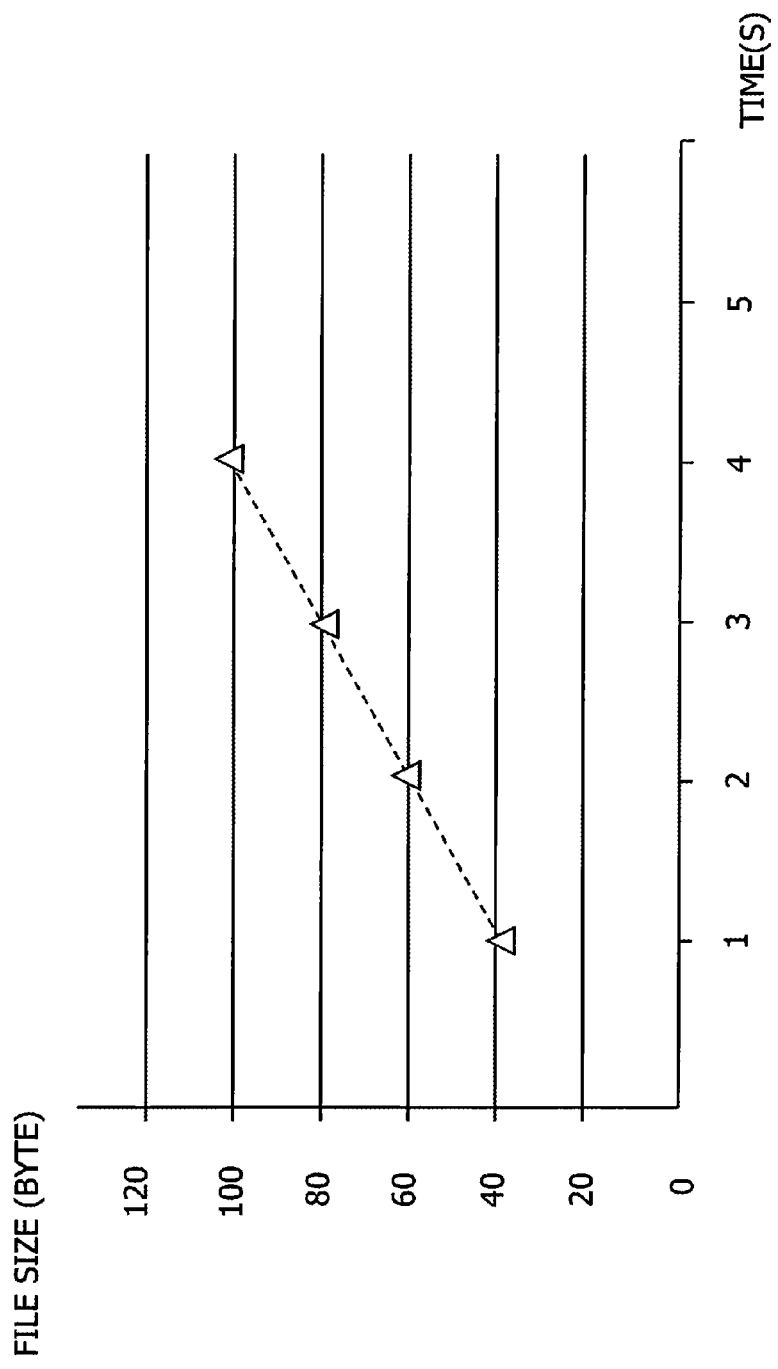
FIG. 15 is a diagram for explaining restoration detection processing in the second embodiment.
Figure 16:
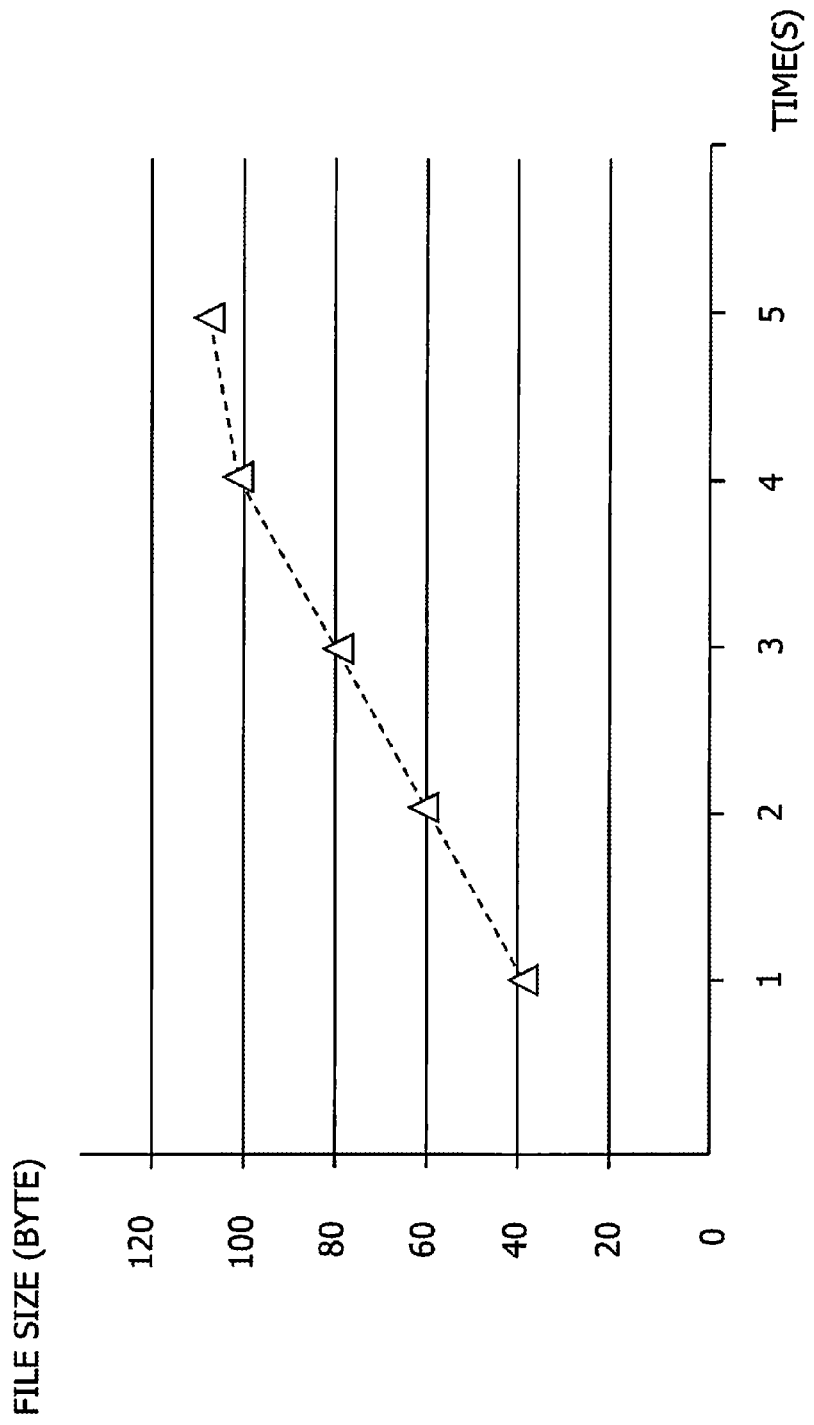
FIG. 16 is a diagram for explaining restoration detection processing in the second embodiment.
Figure 17:
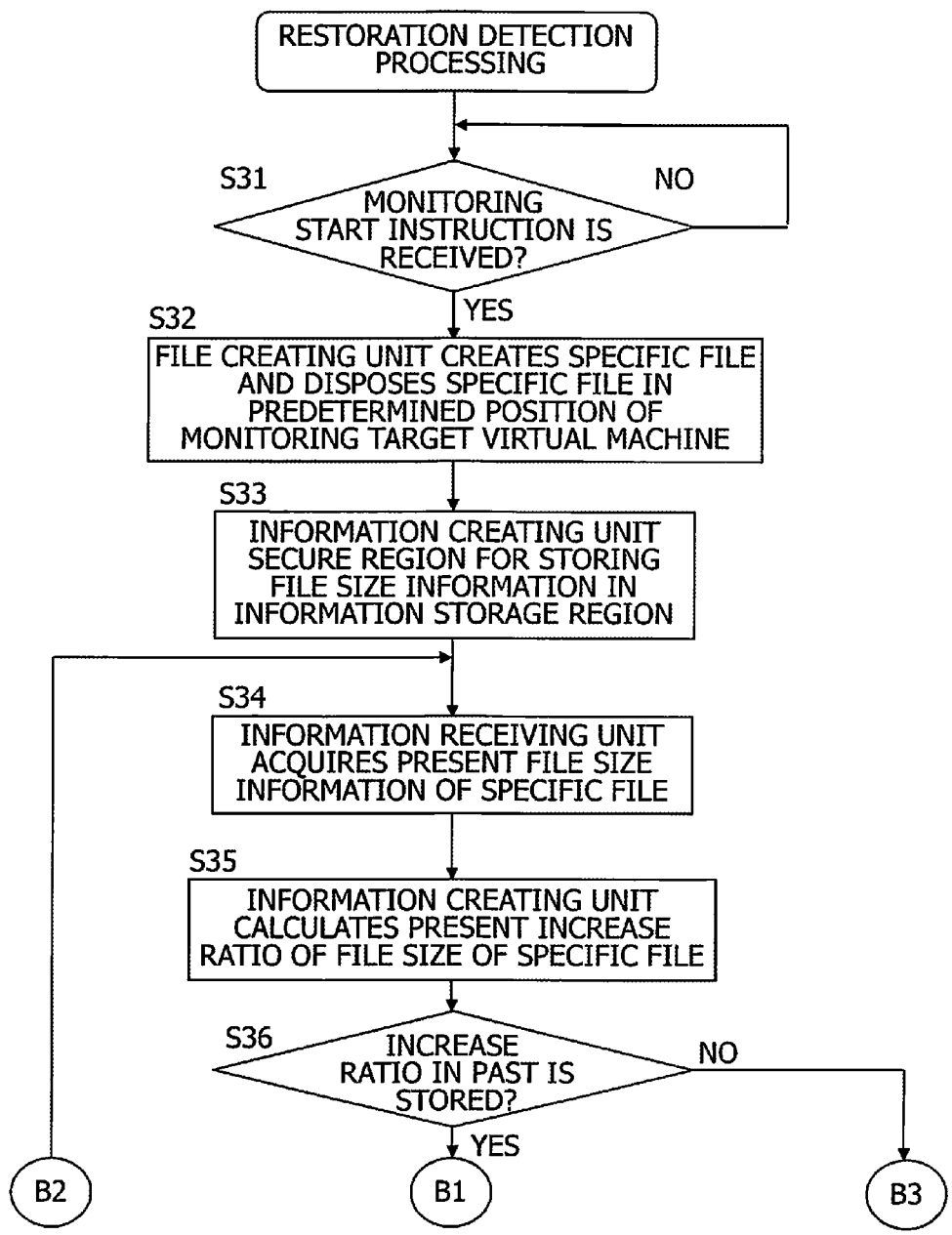
FIG. 17 is a flowchart for explaining the restoration detection processing in the second embodiment.
Figure 18:
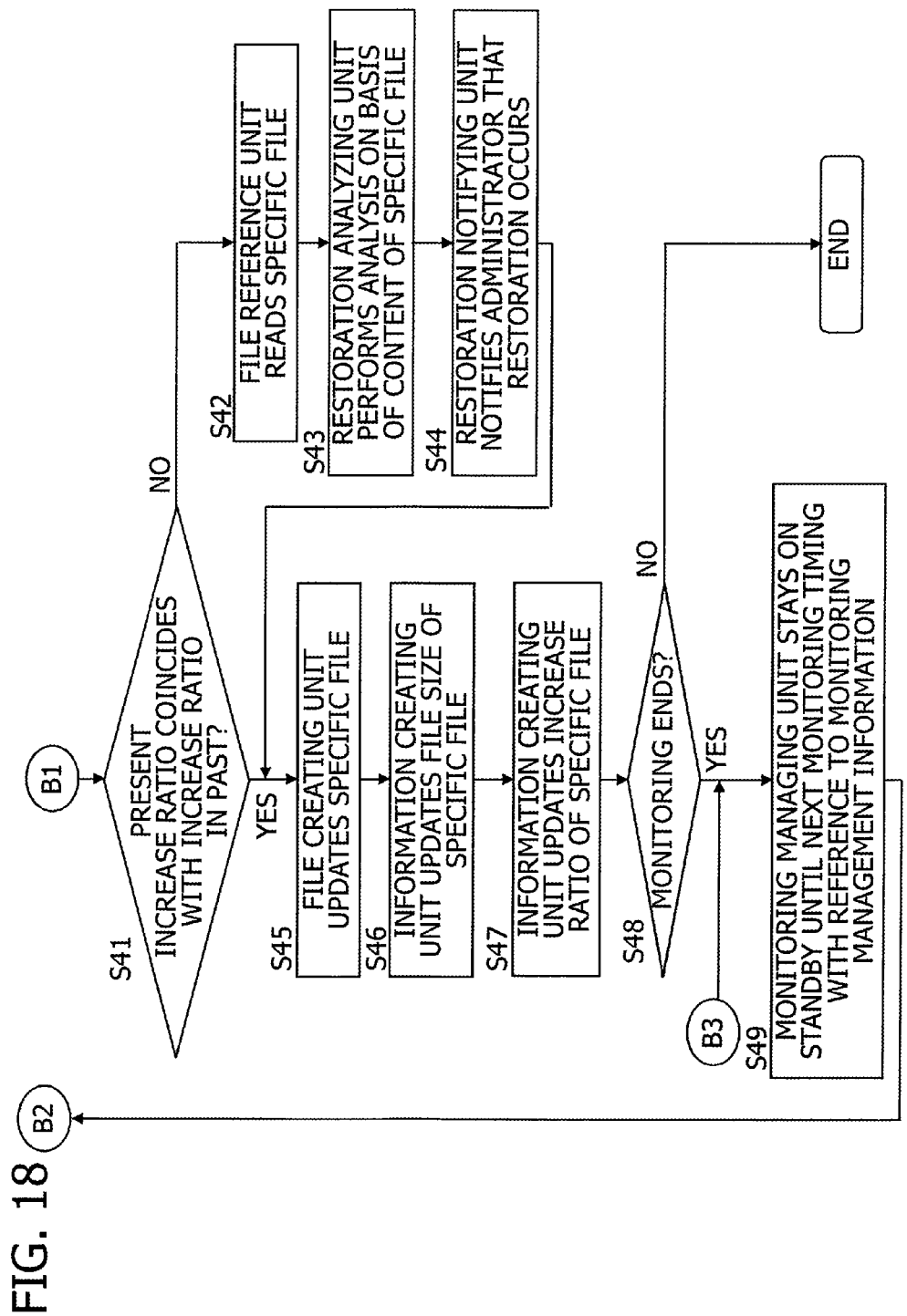
FIG. 18 is a flowchart for explaining the restoration detection processing in the second embodiment.

A second embodiment is explained. FIGS. 15 and 16 are diagrams for explaining restoration detection processing in the second embodiment. FIGS. 17 and 18 are flowcharts for explaining the restoration detection processing in the second embodiment.

FIGS. 15 and 16 are diagrams depicting specific examples of file sizes indicated by the file size information 531 received by the monitoring apparatus 5. In FIGS. 15 and 16, as in the examples depicted in FIGS. 8 and 9, the abscissa indicates time and the ordinate indicates a file size of a specific file. In the examples depicted in FIGS. 15 and 16, white triangles indicate points where times when the file size information 531 is received and file sizes indicated by the received file size information 531 correspond to each other.

The example depicted in FIG. 15 is an example of a specific file, the file size of which cumulatively increases at a fixed rate in proportion to the elapse of time. For example, the specific file in which the times stamps are periodically stored explained with reference to FIGS. 12A and 12B corresponds to this specific file.

The example depicted in FIG. 16 is an example in which the next file size information 531 is received in the state depicted in FIG. 15. In the example depicted in FIG. 16, a file size indicated by the file size information 531 received anew has a value larger than a file size indicated by the file size information 531 received in the past. However, in FIG. 16, whereas an increase ratio of file sizes received between 1 minute and 4 minutes is approximately 20 bytes per minute, an increase ratio of file sizes received between 4 minutes and 5 minutes decreases to approximately 10 bytes per minute. Therefore, in this case, the monitoring apparatus 5 can determine that it is likely that restoration of the virtual machine 3 occurs.

That is, in the second embodiment, unlike the first embodiment, restoration of the monitoring target virtual machine 3 is detected by comparing increase ratios of file sizes concerning a specific file, the file size of which increases at a fixed rate. Specifically, the monitoring apparatus 5 calculates, on the basis of, for example, first file size information of the specific file at the first time and second file size information of the specific file at the second time later than the first time, an increase ratio (hereinafter also referred to as first increase ratio) of the file size of the specific file between first time and second time. Further, the monitoring apparatus 5 calculates, on the basis of the second file size information and third file size information of the specific file at time (hereinafter also referred to as third time) later than the second time, an increase ratio (hereinafter also referred to as second increase ratio) of the file size of the specific file between the second time and the third time. When the second increase ratio is smaller than the first increase ratio, the monitoring apparatus 5 determines that restoration occurs in the monitoring target virtual machine 3. Details of the restoration detection processing performed when the file size of the specific file increases at the fixed rate are explained below.

First, as depicted in FIG. 17, for example, as in the first embodiment, the information receiving unit 511 stays on standby until a monitoring start instruction is received from the management server 1 or the like (S31). When the monitoring start instruction is received (YES in S31), for example, the file creating unit 516 creates a specific file and disposes the specific file in the monitoring target virtual machine 3 (the virtual machine 3 for which the monitoring start instruction is received) (S32).

Subsequently, for example, the information creating unit 512 secures a storage region for storing the file size information 531 of the specific file in the information storage region 530 (S33). Thereafter, for example, the information receiving unit 511 accesses the monitoring target virtual machine 3 and acquires the file size information 531 of the specific file (S34).

Unlike the first embodiment, the information creating unit 512 calculates a present increase ratio (increase ratio per unit time) of the file size of the specific file (S35). Specifically, for example, the information creating unit 512 acquires the file size included in the monitoring management information 532 stored in the information storage region 530 and subtracts the file size from the file size acquired in S34. Further, for example, the information creating unit 512 divide a value calculated by the subtraction by time (a reception interval of the file size) indicated by the monitoring frequency information 533 to thereby calculate an increase ratio per unit time.

Subsequently, when an increase ratio in the past is already stored in the information storage region 530 (YES in S36), the restoration detecting unit 513 compares the present increase ratio and the increase ratio in the past (S41). That is, in order to detect restoration of the virtual machine 3 on the basis of the increase ratio of the file size of the specific file, the increase ratio in the past compared with the increase ratio calculated in S35 needs to be already stored. Therefore, when the increase ratio in the past of the file size is not stored, the monitoring apparatus 5 stays on standby without detecting the virtual machine 3 until the information receiving unit 511 receives the next file size information 531 (S49 in FIG. 18).

As depicted in FIG. 18, as a result of comparing the present increase ratio and the increase ratio in the past, when the increase ratios coincide with each other (YES in S41), for example, the file creating unit 516 updates the specific file in the monitoring target virtual machine 3 (S45). For example, the information creating unit 512 updates the monitoring management information 532 stored in the information storage region 530 (S46 and S47).

FIGS. 19A and 19B are diagrams depicting specific examples of the monitoring management information 532 in the second embodiment. The monitoring management information 532 in the example depicted in FIGS. 19A and 19B stores identification information for identifying the monitoring target virtual machine 3, a latest file size of a specific file disposed in the virtual machine 3, and an increase ratio of the file size of the specific file in association with one another. Specifically, in the example depicted in FIG. 19A, the monitoring apparatus 5 monitors the file size information 531 of the four virtual machines 3 (VM 31, VM 32, VM 33, and VM 34). In the example depicted in FIG. 19A, the latest file sizes of the virtual machines 3 are respectively 17364 bytes, 5462 bytes, 45215 bytes, and 2313 bytes. In the example depicted in FIG. 19A, all increase ratios of the file sizes of the specific files of the virtual machines 3 are 160 bytes per minute. Note that, in the examples depicted in FIGS. 19A and 19B, the specific files of the virtual machines 3 are updated in every 1 minute. In the examples depicted in FIGS. 19A and 19B, the monitoring apparatus 5 receives the file size information 531 in every 2 minutes from the virtual machines 3.

In FIGS. 19A and 19B, for example, when the information receiving unit 511 acquires the file size information 531 from the VM 32 (S34), the information creating unit 512 calculates an increase ratio of the file size of the specific file in the VM 32 (S35). Specifically, the information creating unit 512 acquires, referring to the monitoring management information 532 depicted in FIG. 19A, 5462 bytes stored as the file size of the specific file of the VM 32. The information creating unit 512 subtracts the file size (5462 bytes) acquired from the monitoring management information 532 from the file size (in the examples depicted in FIGS. 19A and 19B, 5782 bytes) acquired in S34 and divides a value obtained by the subtraction by a reception interval (in the examples depicted in FIGS. 19A and 19B, 2 minutes) of the file size information 531 of the monitoring apparatus 5. The information creating unit 512 acquires 160 bytes every minute as a new increase ratio (S35).

Subsequently, for example, the restoration detecting unit 513 acquires 160 bytes per minute, which is an increase ratio in the past included in the monitoring management information 532, as an increase ratio of the VM 32. The restoration detecting unit 513 compares the new increase ratio calculated in S35 and the increase ratio in the past included in the monitoring management information 532 (S36). In the example depicted in FIG. 19A, since both of the new increase ratio and the increase ratio in the past are 160 bytes per minute, the increase ratios coincide with each other. Therefore, the restoration detecting unit 513 determines that restoration does not occur in the monitoring target virtual machine 3 (YES in S36). On the other hand, when the new increase ratio and the increase ratio in the past do not coincide with each other, the restoration detecting unit 513 determines that restoration occurs in the monitoring target virtual machine 3 (NO in S36).

As depicted in FIG. 19B, for example, the information creating unit 512 stores, in the monitoring management information 532, information concerning the file size (5782 bytes) acquired in S34 and the new increase ratio (160 bytes) per minute) acquired in S35 in association with the identification information of the VM 32.

As explained above, according to the second embodiment, when the monitoring apparatus 5 performs the monitoring on the basis of the specific file, the file size of which increases at the fixed rate, the monitoring apparatus 5 manages the increase ratio of the file size of the specific file. When the increase ratio calculated anew is smaller than the increase ratio calculated in the past, the monitoring apparatus 5 determines that restoration occurs in the monitoring target virtual machine 3. Consequently, the monitoring apparatus 5 is capable of also detecting restoration of the virtual machine 3 that occurs when the received file size is larger than the file size received in the past.

Third Embodiment

Figure 20:
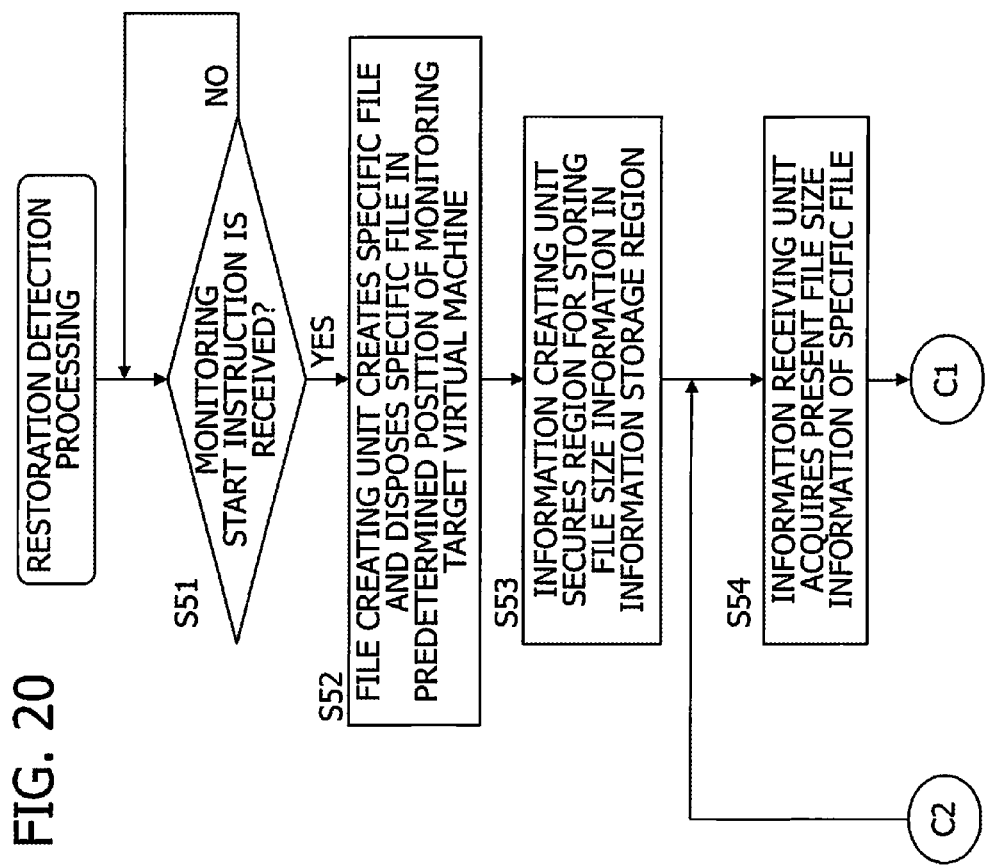
FIG. 20 is a flowchart for explaining restoration detection processing in the third embodiment.
Figure 21:
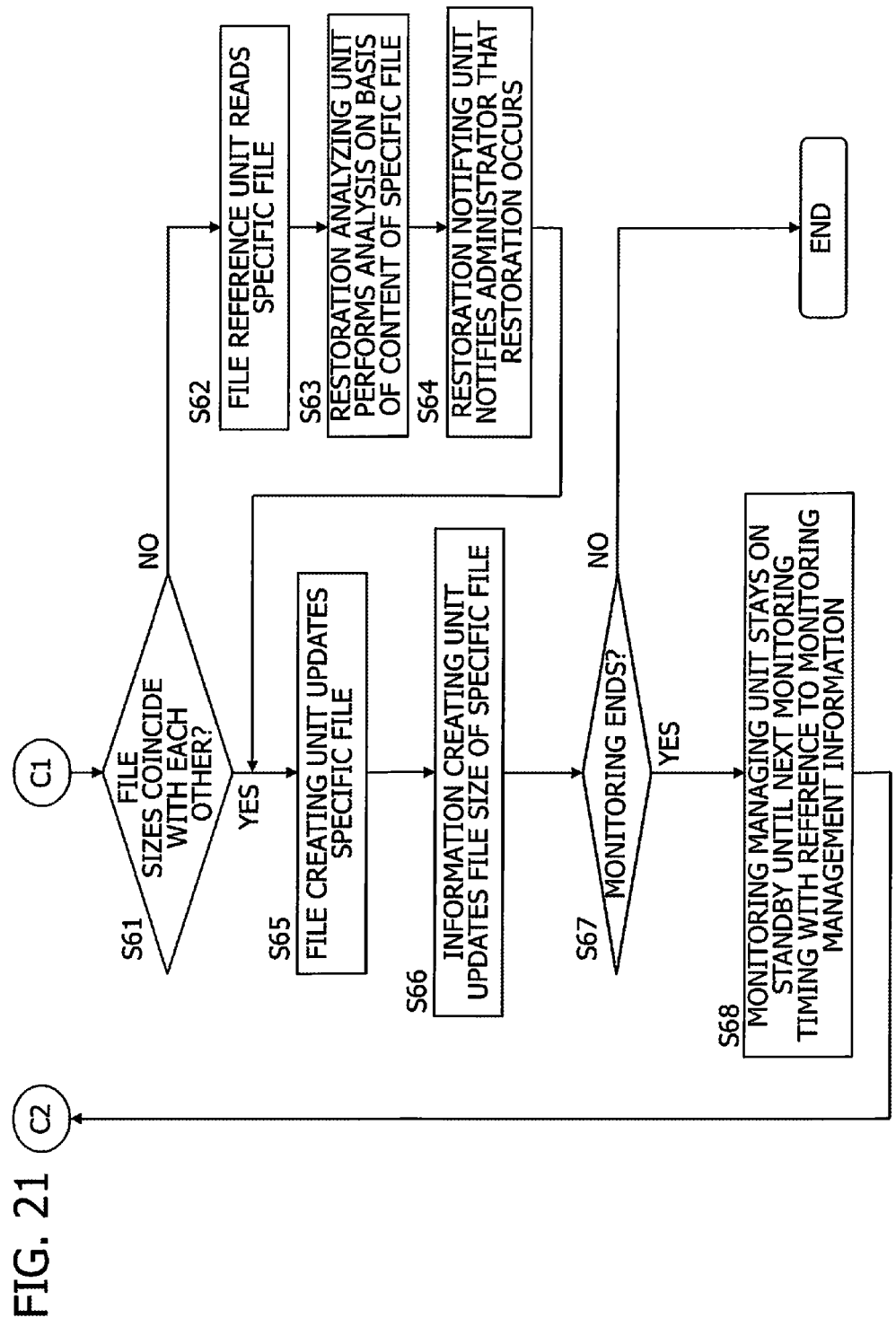
FIG. 21 is a flowchart for explaining restoration detection processing in the third embodiment.

A third embodiment is explained. FIGS. 20 and 21 are flowcharts for explaining restoration detection processing in the third embodiment.

When the monitoring apparatus 5 updates a specific file, for example, the monitoring apparatus 5 can control processing timing to update the specific file after checking presence or absence of execution of restoration of the virtual machine 3. Therefore, in the third embodiment, when the monitoring apparatus 5 updates the specific file, the restoration detecting unit 513 compares a file size included in the monitoring management information 532 stored in the information storage region 530 and a file size acquired from the monitoring target virtual machine 3 again to thereby detect restoration of the virtual machine 3. That is, the file size stored in the information storage region 530 is a file size of a specific file received from the monitoring target virtual machine 3 and is not changed until the next file size information 531 is received. The file size acquired from the monitoring target virtual machine 3 again is not changed either until the specific file is updated by the monitoring apparatus 5. However, the file size acquired from the monitoring target virtual machine 3 again is likely to decrease only when restoration of the virtual machine 3 occurs. Therefore, the monitoring apparatus 5 compares the file size stored in the information storage region 530 and the file size acquired from the virtual machine 3 again. When detecting that the file sizes do not coincide with each other, the monitoring apparatus 5 determines that restoration of the virtual machine 3 occurs. Details of the restoration detection processing performed when the file size included in the monitoring management information 532 and the file size acquired from the virtual machine 3 again are compared are explained below.

First, as depicted in FIG. 20, for example, as in the case depicted in FIG. 10, the information receiving unit 511 stays on standby until a monitoring start instruction is received from the management server 1 or the like (S51). When the monitoring start instruction is received (YES in S51), for example, the file creating unit 516 creates a specific file and disposes the specific file in the monitoring target virtual machine 3 (the virtual machine 3 for which the monitoring start instruction is received) (S52).

Subsequently, for example, the information creating unit 512 secures a storage region for storing the file size information 531 of the specific file in the information storage region 530 (S53). Thereafter, for example, the information receiving unit 511 accesses the monitoring target virtual machine 3 and acquires the file size information 531 of the specific file (S54).

Unlike the first embodiment, the information creating unit 512 compares the present file size acquired in S54 and the file size stored in the information storage region 530 (S61). When the file sizes coincide with each other (YES in S61), for example, the file creating unit 516 updates the specific file in the monitoring target virtual machine 3 (S65). For example, the information creating unit 512 updates the monitoring management information 532 stored in the information storage region 530 on the basis of the received file size information 531 (S66). Since content of the other processing is the same as the content explained in the first embodiment, explanation of the content is omitted.

As explained above, according to the third embodiment, when the monitoring apparatus 5 updates the specific file, the monitoring apparatus 5 compares the file size included in the monitoring management information 532 stored in the information storage region 530 and the file size acquired from the monitoring target virtual machine 3 again. When the file sizes do not coincide with each other, the monitoring apparatus 5 determines that restoration occurs in the monitoring target virtual machine 3. Consequently, the monitoring apparatus 5 can detect restoration of the virtual machine 3 simply by checking whether the compared file sizes coincide with each other. Therefore, it is possible to more easily detect restoration of the virtual machine 3.

Fourth Embodiment

Figure 22:
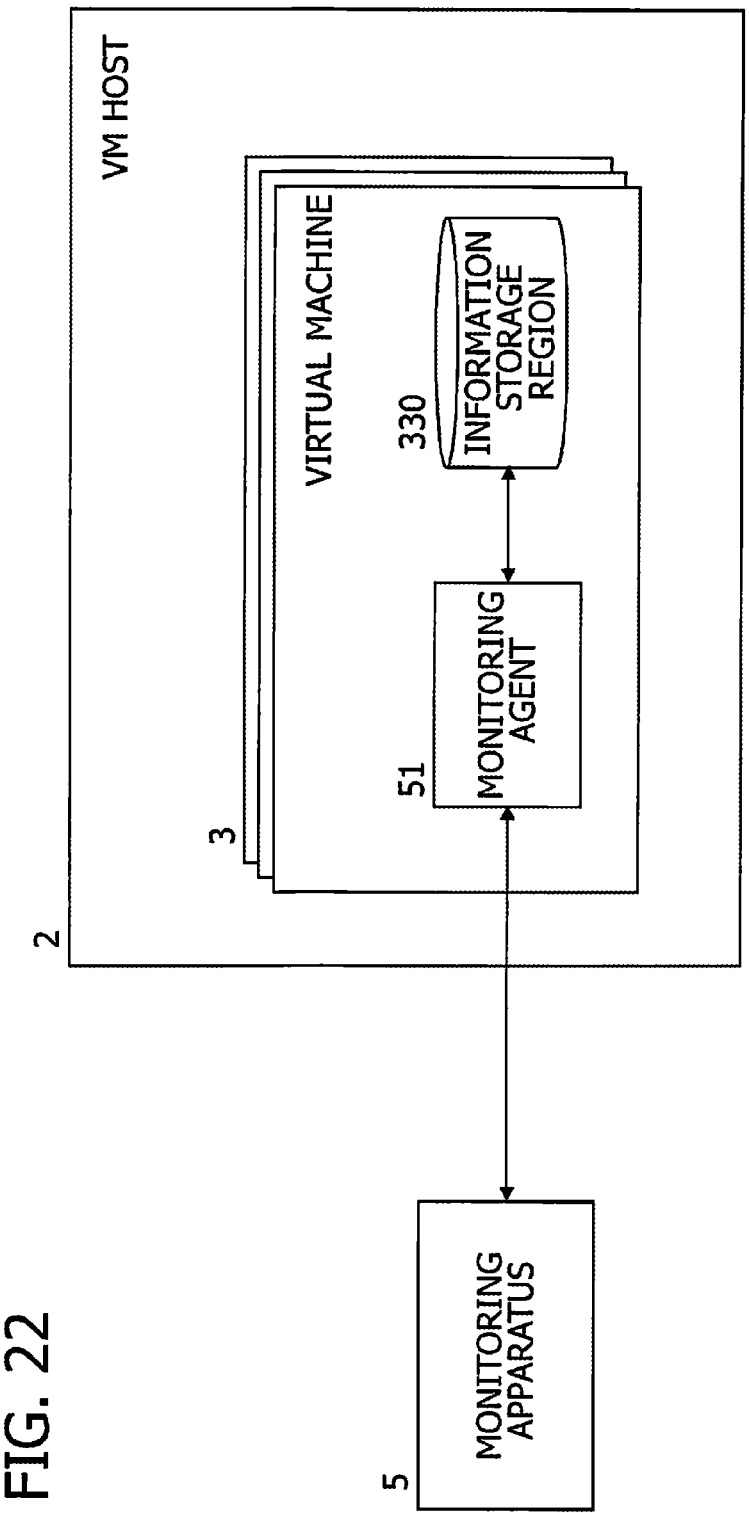
FIG. 22 is a diagram for explaining restoration detection processing in the fourth embodiment.
Figure 23:
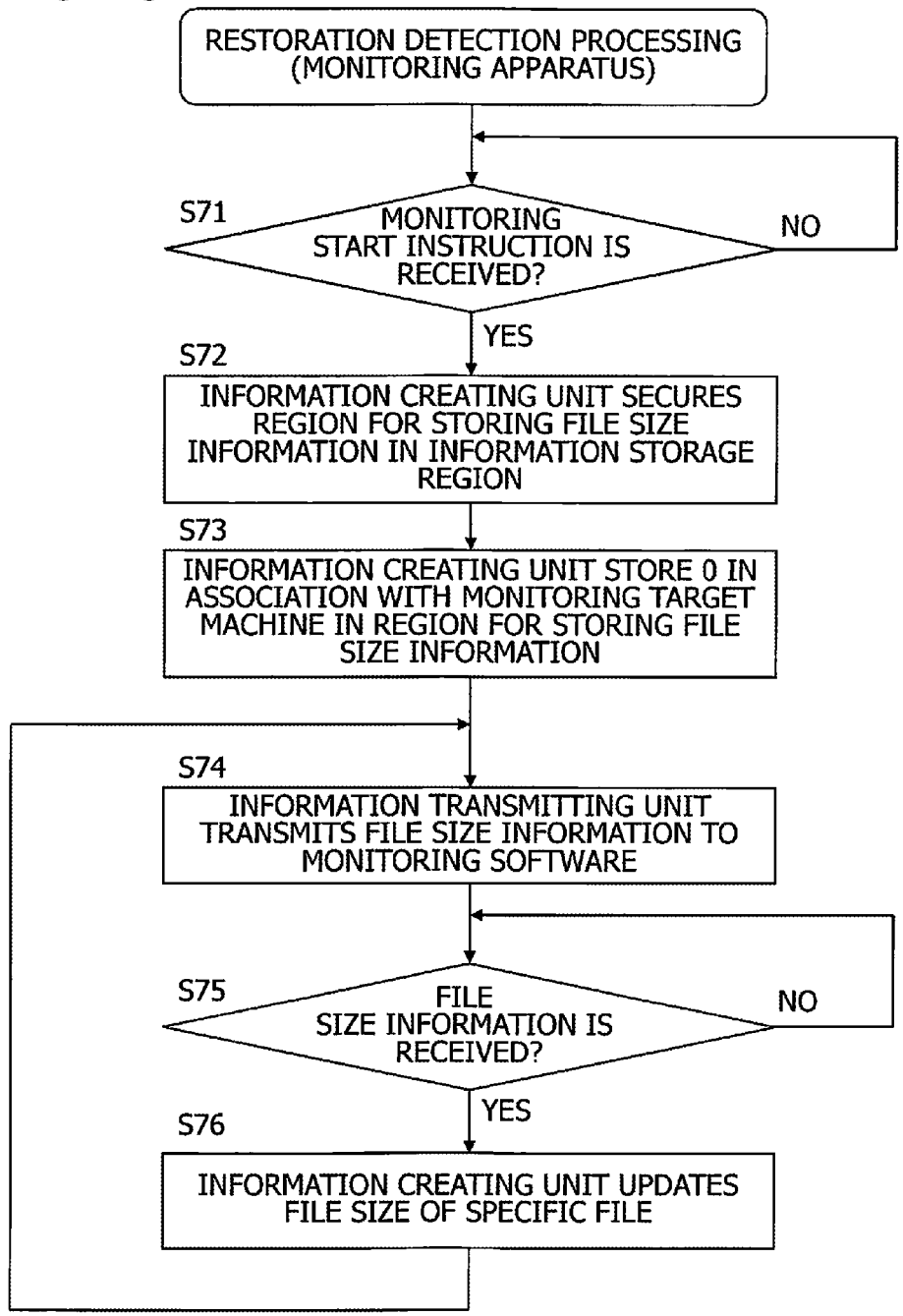
FIG. 23 is a flowchart for explaining the restoration detection processing in the fourth embodiment.
Figure 24:
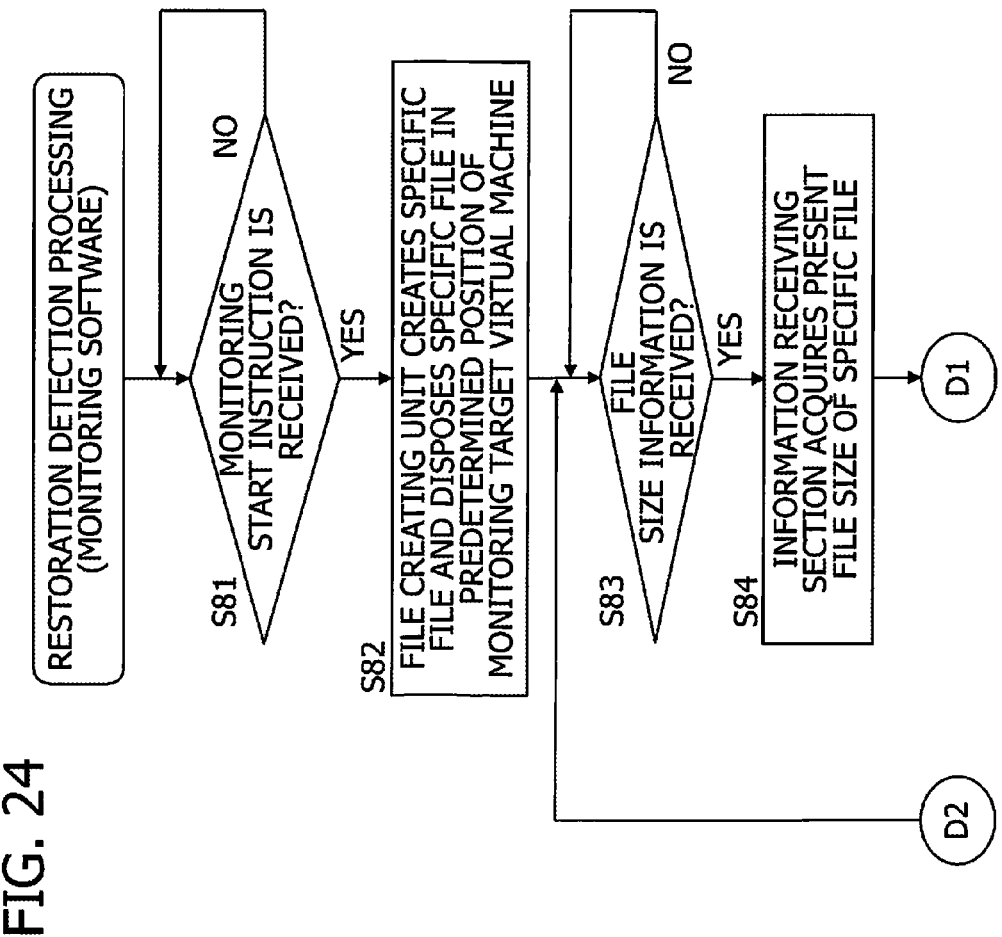
FIG. 24 is a flowchart for explaining the restoration detection processing in the fourth embodiment.
Figure 25:
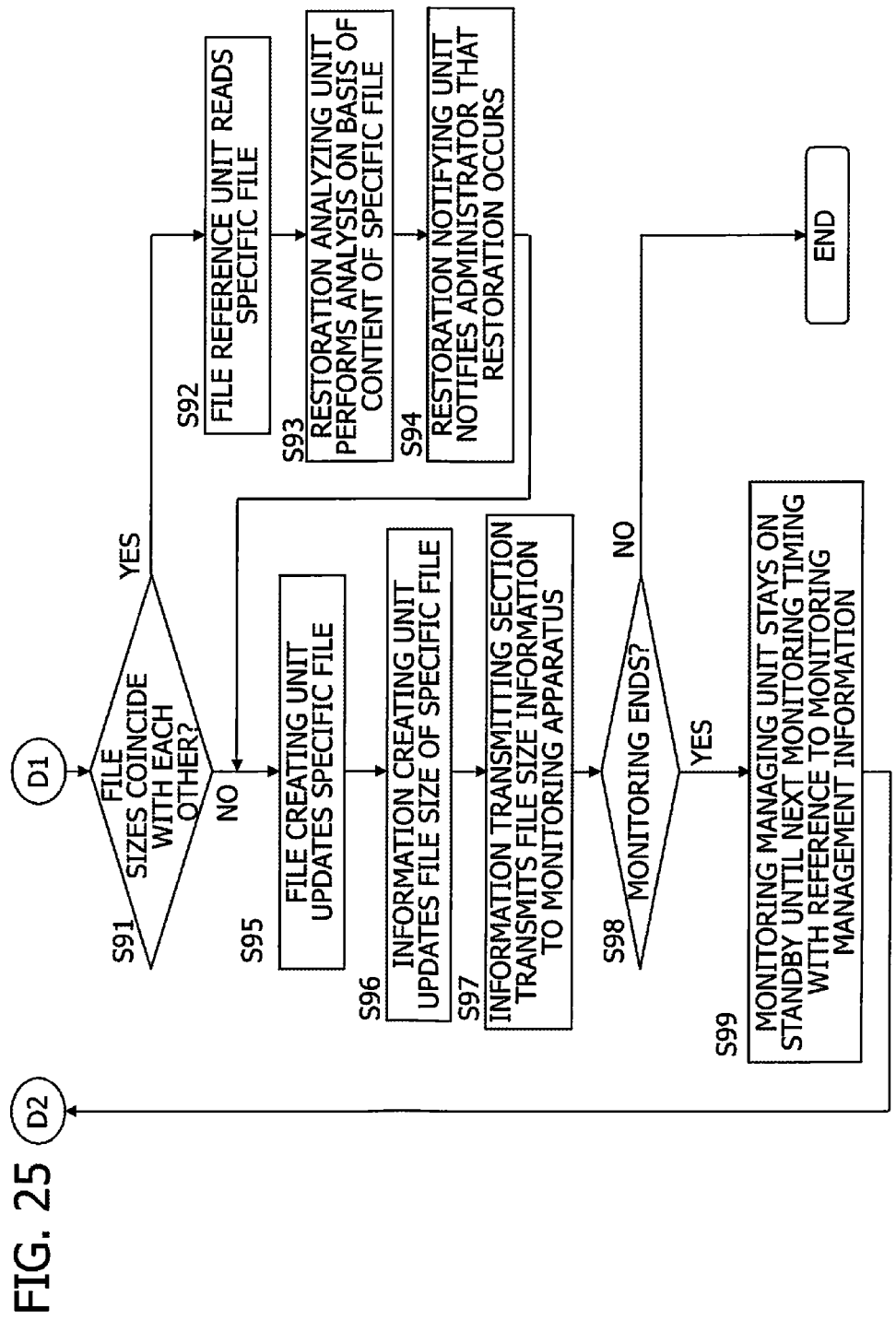
FIG. 25 is a flowchart for explaining the restoration detection processing in the fourth embodiment.

A fourth embodiment is explained. FIG. 22 is a diagram for explaining restoration detection processing in the fourth embodiment. FIGS. 23 to 25 are flowcharts for explaining the restoration detection processing in the fourth embodiment.

In the fourth embodiment, unlike the first embodiment, as depicted in FIG. 22, monitoring software 51 is installed in the monitoring target virtual machine 3. The monitoring software 51 executes a part of the restoration detection processing performed by the monitoring apparatus 5. The monitoring apparatus 5 monitors the virtual machine 3 using the monitoring software 51. Consequently, for example, when there are a large number of monitoring target virtual machines, it is possible to reduce a processing load on the monitoring apparatus 5.

In the fourth embodiment, the monitoring apparatus 5 plays, for example, functions of the information receiving unit 511, the information creating unit 512, and the information transmitting unit 519. The monitoring software 51 uses resources such as the CPUs of the monitoring target virtual machines 3 to thereby play, for example, functions of the restoration detecting unit 513, the file reference unit 514, the restoration analyzing unit 515, the file creating unit 516, the restoration notifying unit 517, and the monitoring managing unit 518 depicted in FIG. 5. In the fourth embodiment, the monitoring software 51 includes an information receiving section (not depicted in the figure) and an information transmitting section (not depicted in the figure) for performing transmission and reception of the file size information 531 to and from the monitoring apparatus 5. Details of the restoration detection processing in the fourth embodiment are explained below. Note that, in the following explanation, the monitoring apparatus 5 detects restoration of the virtual machine 3 according to the restoration detection processing explained in the third embodiment.

First, the restoration detection processing executed in the monitoring apparatus 5 is explained. As depicted in FIG. 23, for example, the information receiving unit 511 stays on standby until a monitoring start instruction is received from the management server 1 or the like (S71). When the monitoring start instruction is received (YES in S71), for example, the information creating unit 512 secures a storage region for storing the file size information 531 of the specific file in the information storage region 530 (S72). Further, for example, the information creating unit 512 stores, in a region for storing the file size information 531, 0 byte in association with the virtual machine 3 for which monitoring is started (S72). That is, in the examples depicted in FIGS. 23 and 24, as explained below, the monitoring software 51 creates a specific file when the monitoring start instruction is received (YES in S81 and S82). Therefore, in S72, the monitoring apparatus 5 stores 0 byte, which is an initial value of a file size of the specific file, in association with the monitoring target virtual machine 3. The information transmitting unit 519 transmits the file size, which is stored in the monitoring target virtual machine 3 in association with the virtual machine 3, to the monitoring software 51 as the file size information 531 (S74).

Subsequently, the information receiving unit 511 stays on standby until the file size information 531 indicating the file size of the updated specific file is received from the monitoring software 51 (S75). When the file size information 531 is received (S76), for example, the information creating unit 512 updates the monitoring management information 532 stored in the information storage region 530 on the basis of the received file size information 531 (S76). That is, in the fourth embodiment, the monitoring software 51 detects and analyzes restoration of the virtual machine 3. Therefore, for example, the monitoring apparatus 5 performs processing such as storage of the file size received from the monitoring software 51.

The restoration detection processing executed in the monitoring software 51 is explained. As depicted in FIG. 24, for example, the information receiving section of the monitoring software 51 stays on standby until a monitoring start instruction is received from the management server 1 or the like (S81). When the monitoring start instruction is received (YES in S81), for example, the file creating unit 516 creates a specific file and disposes the specific file in the monitoring target virtual machine 3 (the virtual machine 3 for which the monitoring start instruction is received) (S82).

Subsequently, when the information receiving section of the monitoring software 51 receives the file size information 531 from the monitoring apparatus 5 (YES in S83), for example, the information receiving unit 511 acquires the file size information 531 of the specific file (S84).

As depicted in FIG. 24, the information creating unit 512 compares the present file size acquired in S84 and the file size stored in the information storage region 530 (S91). As a result, when the file sizes coincide with each other (YES in S91), for example, the file creating unit 516 updates the specific file (S95). For example, the information creating unit 512 updates the monitoring management information 532 stored in the information storage region 530 on the basis of the received file size information (S96). Further, for example, the information transmitting section of the monitoring software 51 transmits the file size information 531 indicating the file size after the update of the specific file to the monitoring apparatus 5 (S97). Since content of the other processing is the same as the content explained in the first embodiment, explanation of the content is omitted.

As explained above, according to the fourth embodiment, a part of the processing for performing the restoration detection processing is performed by the monitoring software 51 installed in the monitoring target virtual machine 3. Consequently, the monitoring apparatus 5 can distribute a processing load involved in the execution of the restoration detection processing to the virtual machines 3. Therefore, it is possible to reduce a processing load on the monitoring apparatus 5.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A restoration detecting method comprising:
   receiving, by a processor, from a monitoring target virtual machine, first file size information indicating a file size of a specific file, the file size of which cumulatively increases as the monitoring target virtual machine runs, at first time and second file size information indicating a file size of the specific file at second time later than the first time; and
   when the file size indicated by the second file size information is smaller than the file size indicated by the first file size information, detecting, by a processor, restoration of the virtual machine between the first time and the second time.

2. The restoration detecting method according to claim 1, wherein
   the specific file is a file, the file size of which increases at a fixed rate according to elapse of time,
   the file size information includes third file size information indicating a file size of the specific file at third time later than the second time is received, and
   the detecting the restoration of the virtual machine includes:
   when a second increase ratio of the file size between the second time and the third time based on the second and third file size information is smaller than a first increase ratio of the file size between the first time and the second time based on the first and second file size information, determining, by a processor, that the restoration has occurred.

3. The restoration detecting method according to claim 1, wherein
   the second time is time after the first time and before the file size of the specific file increases, and
   the detecting the restoration of the virtual machine includes:
   when the first file size information and the second file size information do not coincide with each other, determining, by a processor, that the restoration has occurred.

4. The restoration detecting method according to claim 1, wherein
   the specific file is a file that stores a time stamp at every predetermined time, and
   the detecting the restoration of the virtual machine includes:
   when the restoration has occurred, calculating, by a processor, time differences between times indicated by first time stamps stored in the specific file and times indicated by second time stamps stored in the specific file just after the first time stamps and,
   when a time difference larger than the predetermined time is present among the time differences, determining, by a processor, that time at a restoration destination of the virtual machine is included between the time indicated by the first time stamp and time when the predetermined time elapses.

5. The restoration detecting method according to claim 1, wherein the specific file is a log file that accumulates logs output in the virtual machine.

6. The restoration detecting method according to claim 1, wherein
   the specific file is a file in which the number of files configuring the specific file increase under a predetermined condition, and
   the file size information includes the number of files.

7. The restoration detecting method according to claim 1, wherein the detecting the restoration of the virtual machine is performed on the basis of third file size information indicating a file size of the specific file at third time and fourth file size information indicating a file size at fourth time different from the third time.

8. A restoration detecting apparatus comprising:
   a receiving circuitry configured to receive, from the monitoring target virtual machine, first file size information indicating a file size of a specific file, the file size of which cumulatively increases as the monitoring target virtual machine runs, at first time and second file size information indicating a file size of the specific file at second time later than the first time; and
   when the file size indicated by the second file size information is smaller than the file size indicated by the first file size information, a detecting circuitry configured to detect restoration of the virtual machine between the first time and the second time.

9. A non-transitory computer-readable storage medium storing a restoration detecting program that causes a computer to execute a process comprising:
   receiving, from a monitoring target virtual machine, first file size information indicating a file size of a specific file, the file size of which cumulatively increases as the monitoring target virtual machine runs, at first time and second file size information indicating a file size of the specific file at second time later than the first time; and
   when the file size indicated by the second file size information is smaller than the file size indicated by the first file size information, detecting restoration of the virtual machine between the first time and the second time.

* * * * *